US012800450B2

(12) United States Patent
Takahashi et al.

(10) Patent No.: US 12,800,450 B2
(45) Date of Patent: Nov. 17, 2026

(54) SAMPLE PURIFICATION APPARATUS, ANALYSIS SYSTEM, AND SAMPLE PURIFICATION METHOD

(71) Applicant: Shimadzu Corporation, Kyoto (JP)

(72) Inventors: Kazuteru Takahashi, Kyoto (JP); Masahito Ueda, Kyoto (JP); Hidefumi Yamagata, Kyoto (JP); Shinsuke Inoue, Kyoto (JP); Shinji Hamasaki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 842 days.

(21) Appl. No.: 18/013,379

(22) PCT Filed: Oct. 28, 2020

(86) PCT No.: PCT/JP2020/040343

§ 371 (c)(1),
(2) Date: Dec. 28, 2022

(87) PCT Pub. No.: WO2022/003995

PCT Pub. Date: Jan. 6, 2022

(65) Prior Publication Data

US 2023/0258544 A1 Aug. 17, 2023

(30) Foreign Application Priority Data

Jun. 29, 2020 (JP) ................................ 2020-111223

(51) Int. Cl.
*G01N 1/34* (2006.01)
*G01N 35/10* (2006.01)

(52) U.S. Cl.
CPC .......... *G01N 1/34* (2013.01); *G01N 35/1009* (2013.01)

(58) Field of Classification Search
CPC .... G01N 1/34; G01N 35/1009; G01N 1/4022; G01N 1/4044; Y02W 30/62
See application file for complete search history.

(56) References Cited

U.S. PATENT DOCUMENTS 4,119,533 A * 10/1978 Saitoh ...................... C08J 11/06 209/173
2019/0351427 A1 11/2019 Previero

FOREIGN PATENT DOCUMENTS

CA 2401842 A1 * 9/2000 .............. B03B 5/38
CN 1720441 1/2006
(Continued)

OTHER PUBLICATIONS

Notice of Reasons for Refusal issued Mar. 5, 2024 in corresponding Japanese Patent Application No. 2022-533024, with English language translation.

(Continued)

*Primary Examiner* — John McGuirk
(74) *Attorney, Agent, or Firm* — Wenderoth, Lind & Ponack, L.L.P.

(57) ABSTRACT

A sample purification apparatus includes a container for separating a mixed sample based on a specific gravity difference with the use of a heavy solution, a heavy solution introduction portion for introduction of the heavy solution into the container, a flow-out portion provided vertically above the heavy solution introduction portion in the container, the flow-out portion arranged so that a supernatant of a solution in the container due to the introduction of the heavy solution is flowed out to the outside of the container, and a collector provided vertically below the discharge portion in the container, the collector collecting a component in the mixed sample, the component being lighter in specific (Continued)

gravity than the heavy solution from the supernatant flowed out from the flow-out portion.

14 Claims, 22 Drawing Sheets

(56) References Cited

FOREIGN PATENT DOCUMENTS

| | | | | | |
|---|---|---|---|---|---|
| CN | 109540641 | | | 3/2019 | |
| CN | 109655321 | | | 4/2019 | |
| CN | 109655321 | A | * | 4/2019 | G01N 1/40 |
| CN | 109682654 | | | 4/2019 | |
| CN | 109682654 | A | * | 4/2019 | C02F 1/44 |
| CN | 110108892 | A | | 8/2019 | |
| JP | 2020-508867 | | | 3/2020 | |
| KR | 10-2006-0128458 | | | 12/2006 | |
| KR | 20060128458 | A | * | 12/2006 | C02F 3/1215 |
| WO | 2004/034036 | | | 4/2004 | |
| WO | 2018/115104 | | | 6/2018 | |

OTHER PUBLICATIONS

Notice of Reasons for Refusal issued Dec. 19, 2023 in corresponding Japanese Patent Application No. 2022-533024, with English language translation.

International Search Report issued Jan. 19, 2021 in International (PCT) Application No. PCT/JP2020/040343.

"Guidelines for the Monitoring and Assessment of Plastic Litter in the Ocean," Gesamp Reports and Studies No. 99, National Oceanic and Atmospheric Administration (NOAA), [Searched on Jun. 17, 2020], the Internet URL: https://environmentlive.unep.org/media/docs/marine_plastics/une_science_dvision_gesamp_reports.pdf.

"Guidelines for Harmonizing Ocean Surface Microplastic Monitoring Methods," Version 1.0, [online], May 2019, Ministry of the Environment, [Searched on Jun. 17, 2020], the Internet URL: http://www.env.go.jp/en/water/marine_litter/guidelines/guidelines.pdf.

Written Opinion of the International Searching Authority issued Jan. 19, 2021 in International (PCT) Application No. PCT/JP2020/040343, with machine translation thereof.

Extended European Search Report issued Jul. 8, 2024 in European Patent Application No. 20943396.0.

Office Action issued Feb. 26, 2025 in Chinese Patent Application No. 202080102510.3, with English-language Translation.

Communication pursuant to Article 94(3) EPC issued Feb. 27, 2026 in corresponding European Patent Application No. 20 943 396.0, 9 pages.

* cited by examiner

1

1B

SAMPLE PURIFICATION APPARATUS, ANALYSIS SYSTEM, AND SAMPLE PURIFICATION METHOD

TECHNICAL FIELD

The present disclosure relates to a sample purification apparatus, an analysis system, and a sample purification method.

BACKGROUND ART

In order to collect a component to be collected, a mixed sample containing the component has conventionally been purified. For example, NPLs 1 and 2 disclose a method of collecting microplastic contained in a mixed sample collected from the sea by purifying the mixed sample.

CITATION LIST

Non Patent Literature

NPL 1: "GUIDELINES FOR THE MONITORING AND ASSESSMENT OF PLASTIC LITTER IN THE OCEAN," GESAMP Reports and Studies No. 99, National Oceanic and Atmospheric Administration (NOAA), [Searched on Jun. 17, 2020], the Internet <URL: https://environmentlive.unep.org/media/docs/marine_plastics/une_science_dvision_gesamp_reports.pdf NPL 2: "Guidelines for Harmonizing Ocean Surface Microplastic Monitoring Methods," Version 1.0, [online], May 2019, Ministry of the Environment, [Searched on Jun. 17, 2020], the Internet <URL: http://www.env.go.jp/en/water/marine_litter/guidelines/guidelines.pdf>

SUMMARY OF INVENTION

Technical Problem

In collecting microplastic with the sample purification method disclosed in NPLs 1 and 2, manual works by workers are required in each process for purifying the mixed sample. Furthermore, works for transferring the mixed sample between a plurality of containers are also required. Since some work processes require several days, management is bothersome, times and efforts of workers are also required, and accuracy in collection of a component may vary depending on skills of each worker.

The present disclosure was made to solve such problems, and an object thereof is to provide a technique to accurately purify a mixed sample.

Solution to Problem

A sample purification apparatus that purifies a mixed sample according to one aspect of the present disclosure includes a container for separating, with a heavy solution, the mixed sample based on a specific gravity difference, a heavy solution introduction portion for introduction of the heavy solution into the container, a flow-out portion provided vertically above the heavy solution introduction portion in the container, the flow-out portion arranged so that a supernatant of a solution in the container due to the introduction of the heavy solution is flowed out to the outside of the container, and a collector provided vertically below the flow-out portion in the container, the collector collecting a component in the mixed sample, the component being lighter in specific gravity than the heavy solution from the supernatant flowed out from the flow-out portion.

An analysis system according to one aspect of the present disclosure includes the sample purification apparatus described above and an analysis apparatus that analyzes a component collected by the collector of the sample purification apparatus.

A sample purification method of purifying a mixed sample with a sample purification apparatus including a container according to another aspect of the present disclosure includes, as processing performed by a computer, introducing into the container a heavy solution for separating the mixed sample based on a specific gravity difference to have a supernatant produced by introduction of the heavy solution flow out to the outside of the container and collecting a component in the mixed sample lighter in specific gravity than the heavy solution from the supernatant that has flowed out.

Advantageous Effects of Invention

According to the present disclosure, since a mixed sample can be purified through successive works with the use of a single container, the mixed sample can accurately be purified with time and efforts of a worker being minimized.

DESCRIPTION OF EMBODIMENTS

Figure 1:
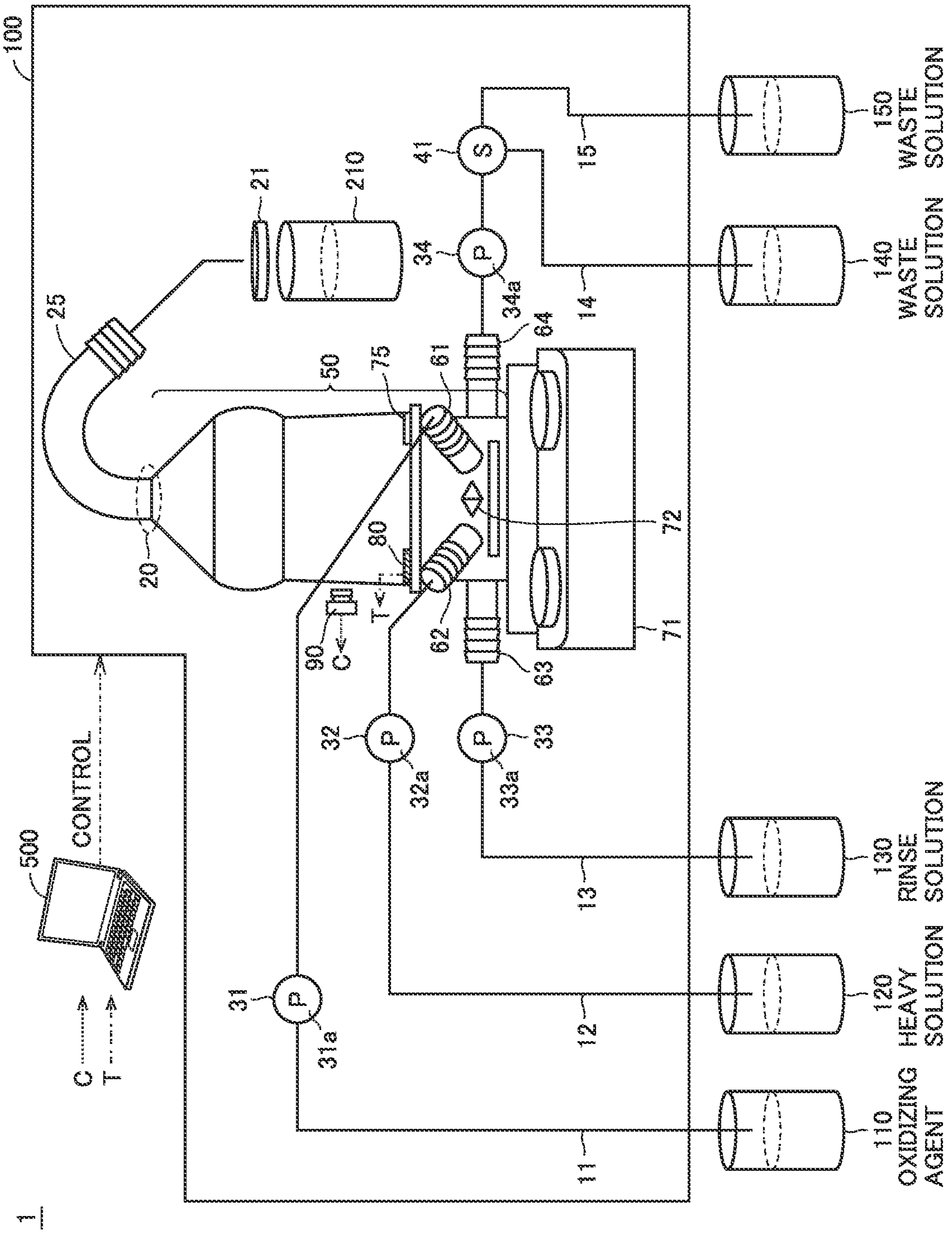
FIG. 1 is a diagram schematically showing a sample purification apparatus according to the present embodiment.

The present embodiment will be described in detail with reference to the drawings. The same or corresponding elements in the drawings have the same reference characters allotted and description thereof will not be repeated in principle.

[Configuration of Sample Purification Apparatus]

FIG. 1 is a diagram schematically showing a sample purification apparatus 1 according to the present embodiment. Sample purification apparatus 1 according to the present embodiment performs processing for collecting, by purifying a mixed sample under the control by a computer 500, a component to be collected that is contained in the mixed sample. "Purification" encompasses purification of a mixture to a pure substance, and in the present embodiment, purification encompasses obtaining a pure substance (component) to be collected from a collected mixed sample.

Any mixed sample may be applicable so long as a "mixed sample" to be purified by sample purification apparatus 1 contains a component to be collected, and exemplary "mixed samples" include seawater and sand collected from the sea or the seashore and processed products such as food and cosmetics. In the present embodiment, seawater and sand collected from the sea or the seashore represent an exemplary "mixed sample." The "mixed sample" is also simply referred to as a "sample" below.

Any component may be applicable so long as the "component" to be collected by sample purification apparatus 1 is collected by sample purification apparatus 1 according to the present embodiment, and exemplary components include microplastic. Microplastic refers, for example, to fine plastic particles each having a length not longer than 5 mm. In the present embodiment, microplastic contained in seawater and sand collected from the sea or the seashore represents an exemplary component.

As shown in FIG. 1, sample purification apparatus 1 includes a sample purification instrument 100 that purifies a sample and computer 500 that controls sample purification instrument 100.

Sample purification instrument 100 includes a container 50, a plurality of pipes 11 to 15, a plurality of pumps 31 to 34, a plurality of ports 61 to 64, an electromagnetic valve 41, a constant-temperature stirrer 71, a stirring bar 72, a Peltier element 75, a temperature sensor 80, a camera 90, a flow-out pipe 25, a detection filter 21, and a container 210.

A sample can be accommodated in container 50. Container 50 is formed from a transparent member such as glass such that camera 90 can observe the inside of container 50 from the outside of container 50. Transmittance of container 50 is set to such transmittance as allowing camera 90 to shoot at least a sample accommodated in container 50.

Pipe 11 is connected to a container 110, and through pipe 11, an oxidizing agent for treatment of a contaminant is introduced from container 110 into port 61 provided in container 50. The "contaminant" refers to a foreign matter in the mixed sample, other than a component to be collected. In the present embodiment, an exemplary "contaminant" includes an organic contaminant having a property of an organic substance.

Any oxidizing agent may be applicable so long as the contaminant is treated with the "oxidizing agent." In the present embodiment, the "contaminant" decomposes an organic contaminant. An exemplary "oxidizing agent" includes oxygenated water (H2O2) and a mixture of oxygenated water (H2O2) and iron (II) oxide (FeO). When seawater and sand are adopted as the "mixed sample," exemplary "organic contaminants" include a scrap piece of wood mixed in seawater or sand and planktons.

Pipe 12 is connected to a container 120, and through pipe 12, a heavy solution for separating a sample based on a specific gravity difference is introduced from container 120 into port 62 provided in container 50.

Any heavy solution may be applicable so long as the "heavy solution" separates the sample based on the specific gravity difference. In the present embodiment, the "heavy solution" allows an inorganic contaminant having a property of an inorganic substance to settle based on the specific gravity difference. Exemplary "heavy solutions" include sodium chloride (NaCl), sodium iodide (NaI), and zinc chloride (ZnCl2). When seawater and sand are adopted as the "mixed sample," exemplary "inorganic contaminants" include sand, glass, and stone. A specific gravity of the "heavy solution" is set to be greater than a specific gravity of the "component" to be collected by sample purification apparatus 1 and to be smaller than a specific gravity of the "inorganic contaminant." For example, when microplastic is adopted as the "component" to be collected by sample purification apparatus 1 and sand, glass, stone, and the like are adopted as the "inorganic contaminant," the "heavy solution" should only be greater in specific gravity than microplastic and should only be smaller in specific gravity than sand, glass, stone, and the like. Specifically, the specific gravity of the "heavy solution" should only be set approximately to 1.5 to 1.7.

Pipe 13 is connected to a container 130, and through pipe 13, a rinse solution for cleaning of the inside of container 50 is introduced from container 130 into port 63 provided in container 50.

Any rinse solution may be applicable so long as the inside of container 50 is cleaned with the "rinse solution," and an exemplary "rinse solution" includes water. In the present embodiment, the "rinse solution" introduced through pipe 13 plays a role to clean the inside of container 50 and a role to dilute the oxidizing agent introduced into container 50.

Pipe 14 is connected to a container 140, and through pipe 14, a waste solution in container 50 is discharged through port 64 provided in container 50 into container 140. Pipe 15 is connected to a container 150, and through pipe 15, the waste solution in container 50 is discharged through port 64 provided in container 50 into container 150.

Pump 31 is provided between pipe 11 and container 50, and as valve 31*a* operates under the control by computer 500, pump 31 suctions the oxidizing agent accommodated in container 110 and introduces the oxidizing agent toward port 61. Pump 32 is provided between pipe 12 and container 50, and as valve 32*a* operates under the control by computer 500, pump 32 suctions the heavy solution accommodated in container 120 and introduces the heavy solution toward port 62. Pump 33 is provided between pipe 13 and container 50, and as valve 33*a* operates under the control by computer 500, pump 33 suctions the rinse solution accommodated in container 130 and introduces the rinse solution toward port 63. Pump 34 is provided between each of pipes 14 and 15 and container 50, and as valve 34*a* operates under the control by computer 500, pump 34 suctions the waste solution in container 50 and discharges the waste solution through port 64 toward container 140 or 150. Each of valves 31*a* to 34*a* represents an exemplary "switching unit" and switches between entry and exit of a solution by opening and closing of a passage provided in each of pumps 31 to 34.

Any switching unit may be applicable so long as the "switching unit" switches between entry and exit of a solution in each of pipes 11 to 15. For example, the "switching unit" may allow suction and delivery by reciprocating motion of a piston or the like or by rotary motion of a gear or the like. The "solution" includes the oxidizing agent, the heavy solution, the rinse solution, the waste solution, and the like.

Ports 61 and 64 serve as an inlet and an outlet for entry and exit of a solution provided in an outer circumferential portion of container 50. In the inside of each of ports 61 to 64, a filter (for example, a filter 163 or 164 shown in FIG. 19 which will be described later) is provided so as not to allow discharge of a component contained in a sample to the outside.

Electromagnetic valve 41 is provided between each of pipes 14 and 15 and pump 34, and as electromagnetic valve 41 operates under the control by computer 500, electromagnetic valve 41 switches a path through which the waste solution passes between a path between pipe 14 and pump 34 and a path between pipe 15 and pump 34.

Constant-temperature stirrer 71 represents an exemplary "stirring unit" and an exemplary "heating unit." Container 50 is carried on constant-temperature stirrer 71. Constant-temperature stirrer 71 stirs a sample accommodated in container 50 by rotation of a stirring bar 72 provided in container 50 under the control by computer 500. Furthermore, constant-temperature stirrer 71 heats the sample accommodated in container 50 under the control by computer 500. The "heating unit" is not limited to the constant-temperature stirrer, and another means capable of heating the sample in container 50 may be applicable.

Peltier element 75 represents an exemplary "cooling unit." Peltier element 75 cools the sample accommodated in container 50 under the control by computer 500. The "cooling unit" is not limited to the Peltier element, and another means capable of cooling the sample in container 50 may be applicable.

Temperature sensor 80 is provided, for example, on a bottom surface in container 50, and measures a temperature of the sample accommodated in container 50. A measurement value T from temperature sensor 80 is provided to computer 500.

Camera 90 is provided, for example, on the outside of container 50, and shoots the sample accommodated in container 50. Image data C obtained by shooting by camera 90 is provided to computer 500. Camera 90 may shoot not only still images but also moving images.

Flow-out pipe 25 is connected to a flow-out port 20 provided at an uppermost portion of container 50, and through flow-out pipe 25, a supernatant of the sample that overflows container 50 is flowed out to the outside. Flow-out port 20 represents an exemplary "flow-out portion." Flow-out pipe 25 represents an exemplary "flow-out path." Detection filter 21 collects, by filtering the supernatant of the sample flowed out through flow-out pipe 25, a component to be collected that is contained in the supernatant. The supernatant that has passed through detection filter 21 is collected in container 210. In a preferred embodiment, detection filter 21 is a filter capable of trapping microplastic to be collected. A specific example of the filter includes a wire gauze made of SUS (stainless steel) or a membrane filter made of PTFE (made of Teflon™). Detection filter 21 represents an exemplary "collector."

Computer 500 may be implemented by a general-purpose computer or a dedicated computer for controlling sample purification instrument 100. Computer 500 controls each of valves 31*a* to 34*a*, electromagnetic valve 41, and constant-temperature stirrer 71 in sample purification instrument 100.

Specifically, computer 500 has electric power provided to a motor (not shown) in each of valves 31*a* to 34*a* to drive the motor. Drive force from the motor opens and closes valves 31*a* to 34*a* so that pumps 31 to 34 suction and deliver a solution.

Computer 500 has a current flow to a solenoid (not shown) of electromagnetic valve 41 to open and close a valve (not shown) to thereby switch between paths through which the waste solution passes.

Computer 500 controls constant-temperature stirrer 71 based on at least any one of measurement value T obtained from temperature sensor 80 and image data C obtained from camera 90 to heat the sample accommodated in container 50. Computer 500 has electric power provided to a motor (not shown) of constant-temperature stirrer 71 to drive the motor. Drive force from the motor rotates stirring bar 72 to thereby stir the sample accommodated in container 50. In addition, computer 500 has electric power provided to a heater (not shown) of constant-temperature stirrer 71 to apply constant heat to container 50.

Computer 500 controls Peltier element 75 based on at least any one of measurement value T obtained from temperature sensor 80 and image data C obtained from camera 90 to cool the sample accommodated in container 50.

Figure 2:
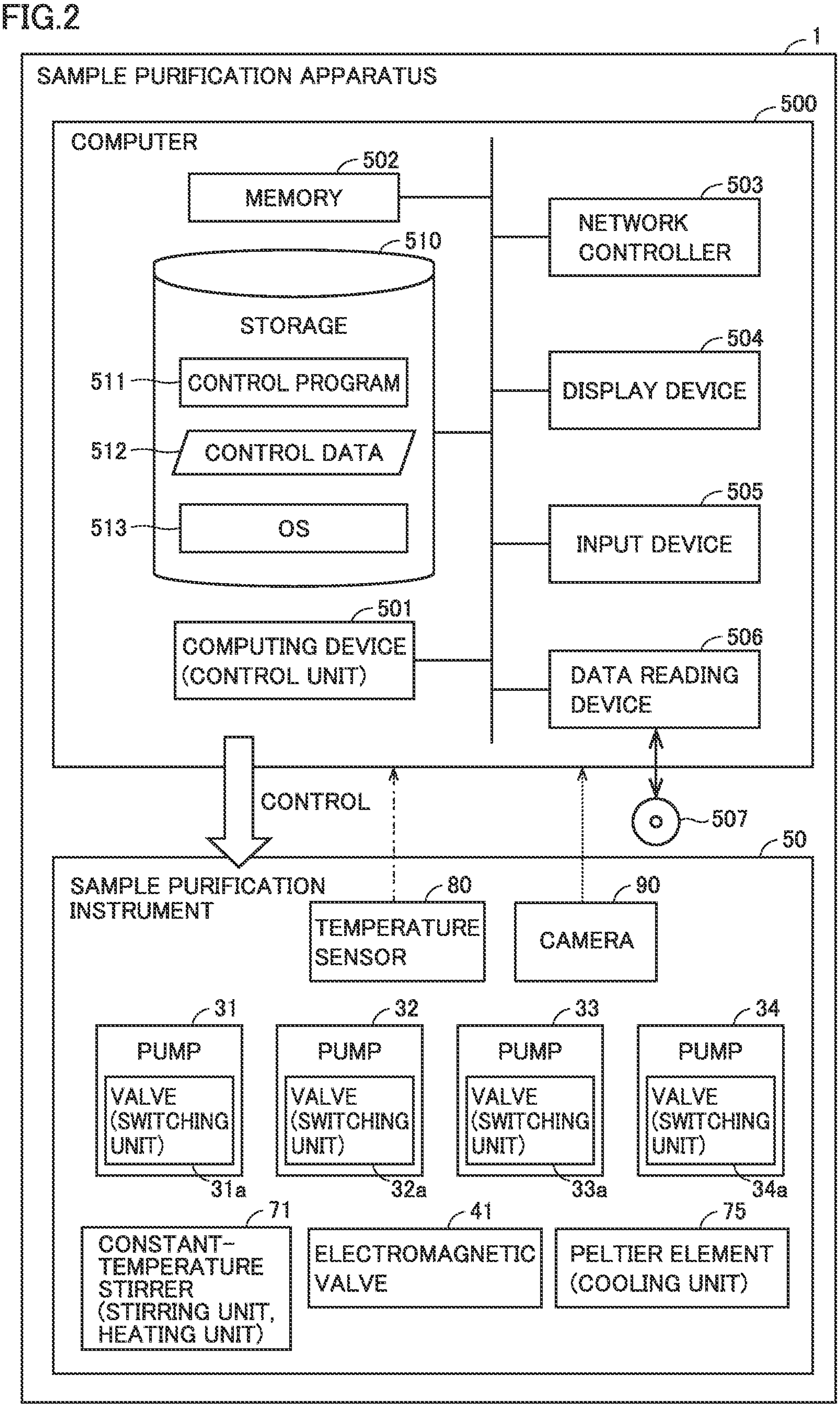
FIG. 2 is a diagram schematically showing an internal configuration of the sample purification apparatus according to the present embodiment.

FIG. 2 is a diagram schematically showing an internal configuration of sample purification apparatus 1 according to the present embodiment. As shown in FIG. 2, computer 500 includes, as main hardware elements thereof, a computing device 501, a memory 502, a network controller 503, a display device 504, an input device 505, a data reading device 506, and a storage 510.

Computing device 501 represents an exemplary "control unit." Computing device 501 is a processing entity that performs various types of processing by executing various programs. For example, computing device 501 performs sample purification processing (which will be described later with reference to FIG. 17) for controlling each of valves 31*a* to 34*a*, electromagnetic valve 41, and constant-temperature stirrer 71 in sample purification instrument 100 by executing a control program 511 which will be described later.

Computing device 501 is implemented, for example, by a central processing unit (CPU), a field programmable gate array (FPGA), a graphics processing unit (GPU), and the like. Computing device 501 may be implemented by processing circuitry that performs computing.

Though computing device 501 included in computer 500 is provided as an exemplary "control unit" in the present embodiment, the "control unit" may be a controller such as a programmable logic controller (PLC) that subjects each feature to sequence control in accordance with a program created by a user. Furthermore, though the "control unit" is separate from sample purification instrument 100 in the present embodiment, the "control unit" may be integrated with sample purification instrument 100. For example, sample purification instrument 100 may contain a device corresponding to computing device 501.

Memory 502 provides a storage area where a program code or a work memory is temporarily stored in execution of any program by computing device 501. Memory 502 is implemented, for example, by a volatile memory device such as a dynamic random access memory (DRAM) or a static random access memory (SRAM).

Network controller 503 carries out transmission and reception to and from another device over a network (not shown). Network controller 503 is in conformity with any communication scheme such as Ethernet®, wireless local area network (LAN), and Bluetooth®.

Display device 504 is implemented, for example, by a liquid crystal display (LCD), and shows a program design screen or an alert screen on the occurrence of an abnormal condition.

Input device 505 is implemented, for example, by a keyboard, a mouse, and the like, and used for input of design information by a user in design of a program. Input device 505 may be implemented by a start switch for starting sample purification processing by computing device 501.

Data reading device 506 is a device for reading data stored in a storage medium 507. Any storage medium such as a compact disc (CD), a digital versatile disc (DVD), and a universal serial bus (USB) memory may be applicable so long as various types of data can be stored in storage medium 507.

Storage 510 provides a storage area where various types of data required for sample purification processing or the like are stored. Storage 510 is implemented, for example, by a non-volatile memory device such as a hard disk or a solid state drive (SSD). Control program 511, control data 512, and an operating system (OS) 513 are stored in storage 510.

Control program 511 is a program in which contents of sample purification processing are described, and executed by computing device 501. Control program 511 may be designed by a user with the use of input device 505, read from storage medium 507 by data reading device 506, or obtained through the network from another device such as a server by network controller 503.

Control data 512 is data used in execution of control program 511 by computing device 501. For example, control data 512 includes data for controlling each of valves 31*a* to 34*a*, electromagnetic valve 41, constant-temperature stirrer 71, Peltier element 75, temperature sensor 80, and camera 90. Control data 512 may be inputted by a user with the use of input device 505, read from storage medium 507 by data reading device 506, or obtained through the network from another device such as a server by network controller 503.

OS 513 provides a basic function for computing device 501 to perform various types of processing.

[Sample Purification Method]

A sample purification method with the use of sample purification apparatus 1 will be described with reference to FIGS. 3 to 16. FIGS. 3 to 16 are diagrams for illustrating the sample purification method with the use of sample purification apparatus 1 according to the present embodiment.

For prior preparation, a user such as a worker prepares container 110, container 120, container 130, container 140, container 150, container 210, and detection filter 21. The user places the oxidizing agent in container 110 and inserts pipe 11 into container 110. The user places the heavy solution in container 120 and inserts pipe 12 into container 120. The user places the rinse solution in container 130 and inserts pipe 13 into container 130. The user inserts pipe 14 into container 140 and inserts pipe 15 into container 150. At this stage, each of containers 140 and 150 is empty. The user arranges detection filter 21 and container 210 around an outlet of flow-out pipe 25 in this order from a side of flow-out pipe 25.

Figure 3:
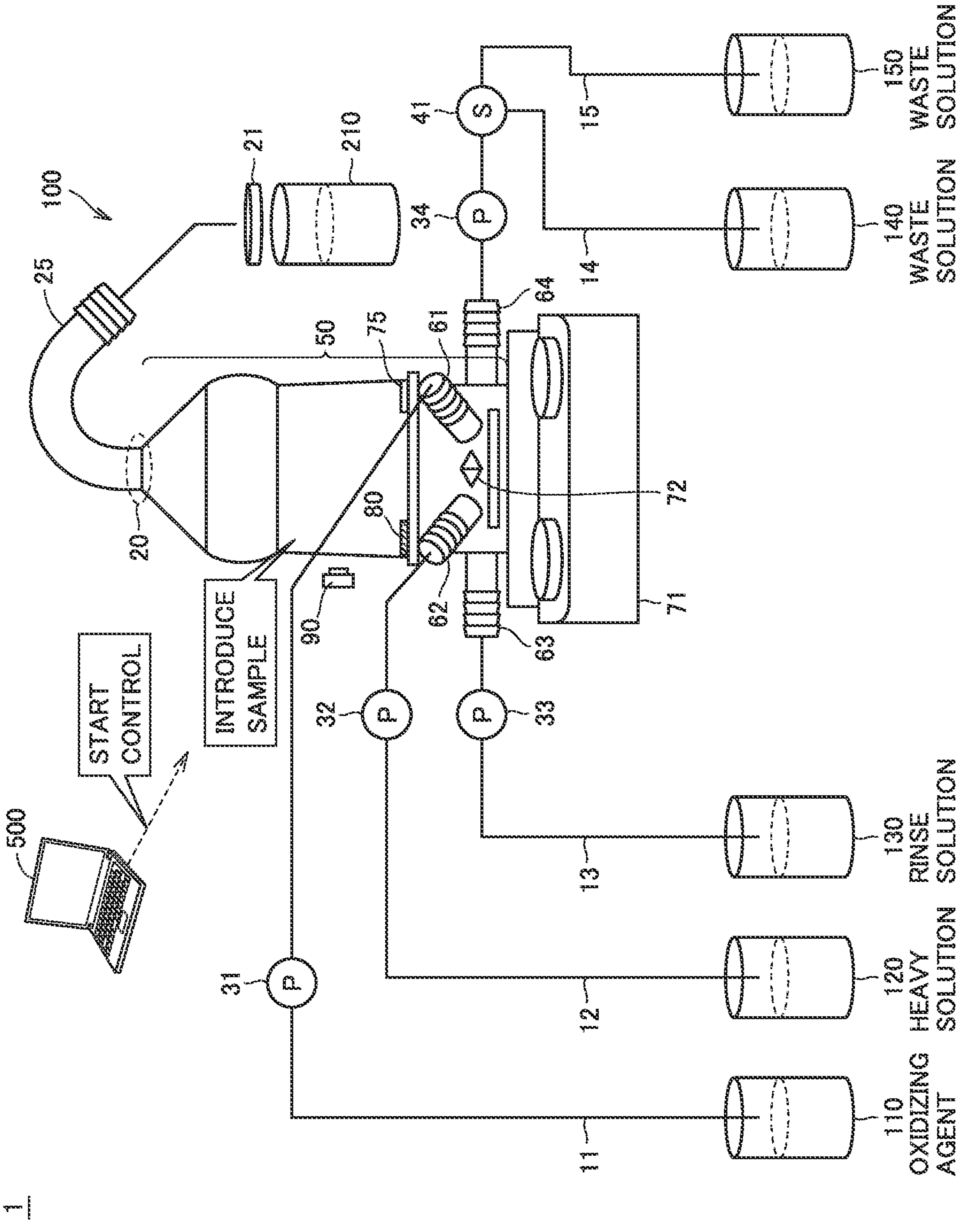
FIG. 3 is a diagram for illustrating a sample purification method with the use of the sample purification apparatus according to the present embodiment.

As shown in FIG. 3, the user introduces the sample (mixed sample) into container 50 of sample purification apparatus 1. For example, the user separates a part of container 50 constituted of a plurality of members to open container 50 and feeds the sample into container 50. Thereafter, the user performs a start operation with the use of input device 505 of computer 500 to start control of sample purification instrument 100 by computer 500.

Figure 4:
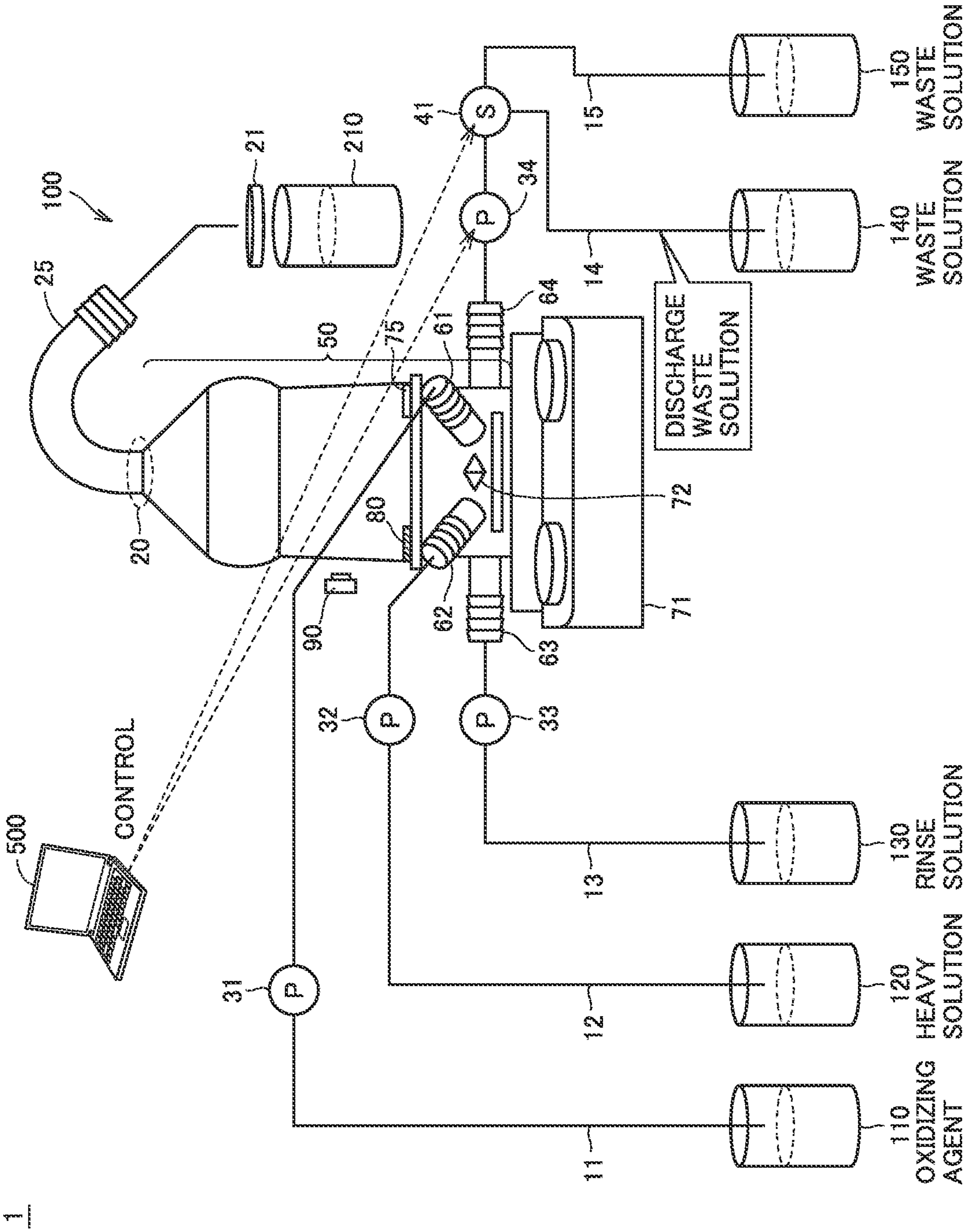
FIG. 4 is a diagram for illustrating the sample purification method with the use of the sample purification apparatus according to the present embodiment.

As control by computer 500 is started, as shown in FIG. 4, computer 500 controls valve 34*a* and electromagnetic valve 41 to discharge the waste solution in container 50 to container 140 through port 64 and pipe 14. The sample accommodated in container 50 contains the waste solution such as seawater, and such waste solution is discharged to container 140. Microplastic to be collected that is contained in the sample, on the other hand, is not discharged to the outside owing to filter 164 (see FIG. 19) included in port 64 but remains in container 50.

Figure 5:
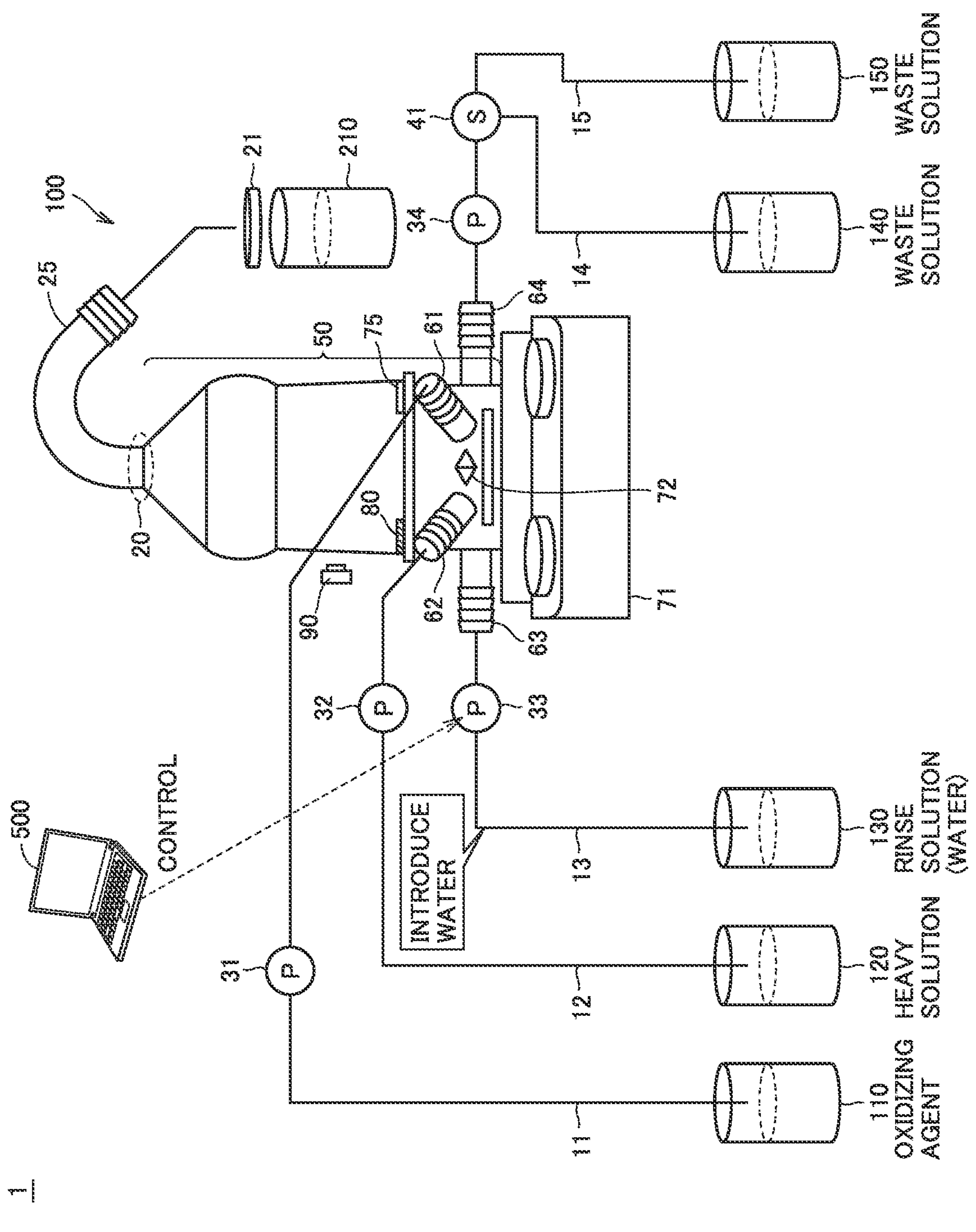
FIG. 5 is a diagram for illustrating the sample purification method with the use of the sample purification apparatus according to the present embodiment.

Then, as shown in FIG. 5, computer 500 controls pump 33 to introduce water accommodated in container 130 into container 50 through pipe 13 and port 63. At this time, computer 500 controls an amount of suction by pump 33 to introduce water in an amount set in advance by the user into container 50. For example, computer 500 adjusts opening of valve 33*a* to control the amount of suction by pump 33. Alternatively, computer 500 may control the amount of suction by pump 33 based on a detection value from a liquid level sensor provided in container 130 or container 50. In the present embodiment, the rinse solution (water) used for cleaning of the inside of container 50 is used as a solvent for dilution of the oxidizing agent to be introduced in container 50. Water for cleaning of the inside of container 50 and the solvent for dilution of the oxidizing agent to be introduced into container 50 may be accommodated in different containers and may be introduced into container 50 through paths different from each other. In this case, the solvent for dilution of the oxidizing agent and the rinse solution used for cleaning of the inside of container 50 may be composed of solutions different in type from each other.

Figure 6:
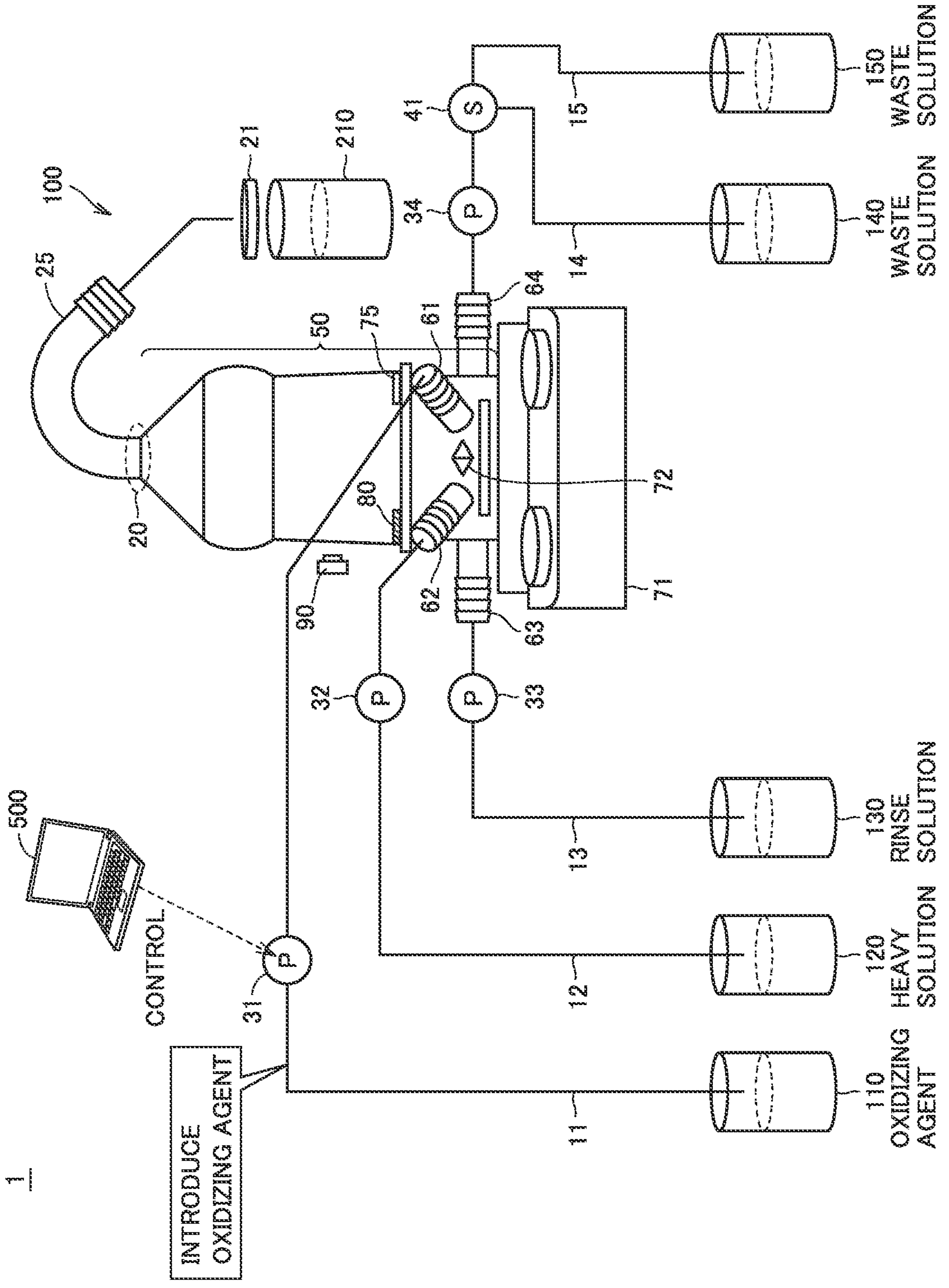
FIG. 6 is a diagram for illustrating the sample purification method with the use of the sample purification apparatus according to the present embodiment.

Then, as shown in FIG. 6, computer 500 controls valve 31*a* to introduce the oxidizing agent accommodated in container 110 into container 50 through pipe 11 and port 61. At this time, computer 500 controls the amount of suction by pump 31 to introduce the oxidizing agent in an amount set in advance by the user into container 50. For example, computer 500 adjusts opening of valve 31*a* of pump 31 to control the amount of suction by pump 31. Alternatively, computer 500 may control the amount of suction by pump 31 based on a detection value of a liquid level sensor provided in container 110 or container 50.

When the sample in container 50 contains a substance (for example, manganese dioxide or iodine) that serves as a catalyst for decomposition reaction by the oxidizing agent (for example, oxygenated water), direct addition of the oxidizing agent to the sample may accelerate the decomposition reaction by the oxidizing agent, and heat generation at the time of oxidation reaction may cause boiling of the oxidizing agent. On the occurrence of such a situation, the sample may burst out of container 50 or may be degenerated by heat generation, which may affect evaluation of an amount of collection of a component (for example, microplastic) to be collected and qualitative evaluation. In view of such an aspect, in the present embodiment, before introduction of the oxidizing agent into container 50 in a step shown in FIG. 6, water is introduced into container 50 in advance in a step shown in FIG. 5. As the oxidizing agent introduced in container 50 is diluted by being mixed with water in container 50, abrupt reaction of the sample accommodated in container 50 with the oxidizing agent can be avoided as much as possible.

Figure 7:
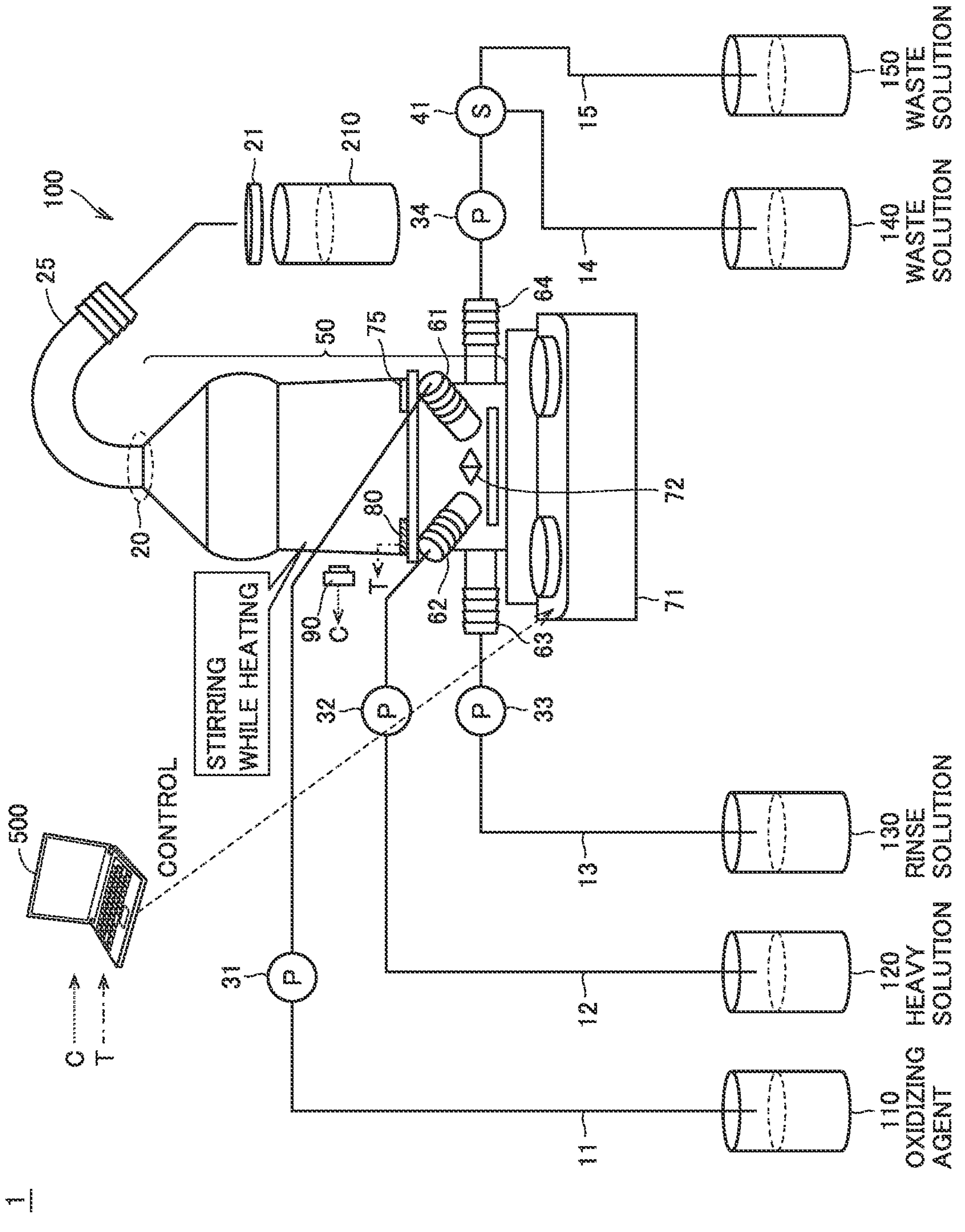
FIG. 7 is a diagram for illustrating the sample purification method with the use of the sample purification apparatus according to the present embodiment.

Then, as shown in FIG. 7, computer 500 controls constant-temperature stirrer 71 to rotate stirring bar 72 provided in container 50 while constant heat is applied to container 50. A temperature of container 50 and a rotation speed of stirring bar 72 are set in advance by the user. As the sample is thus stirred, oxidation treatment with the oxidizing agent is performed and an organic contaminant contained in the sample is decomposed. Though heating is not necessarily required in stirring of the sample, decomposition by oxidation treatment tends to be expedited by heating to keep the temperature of the sample constant.

Figure 8:
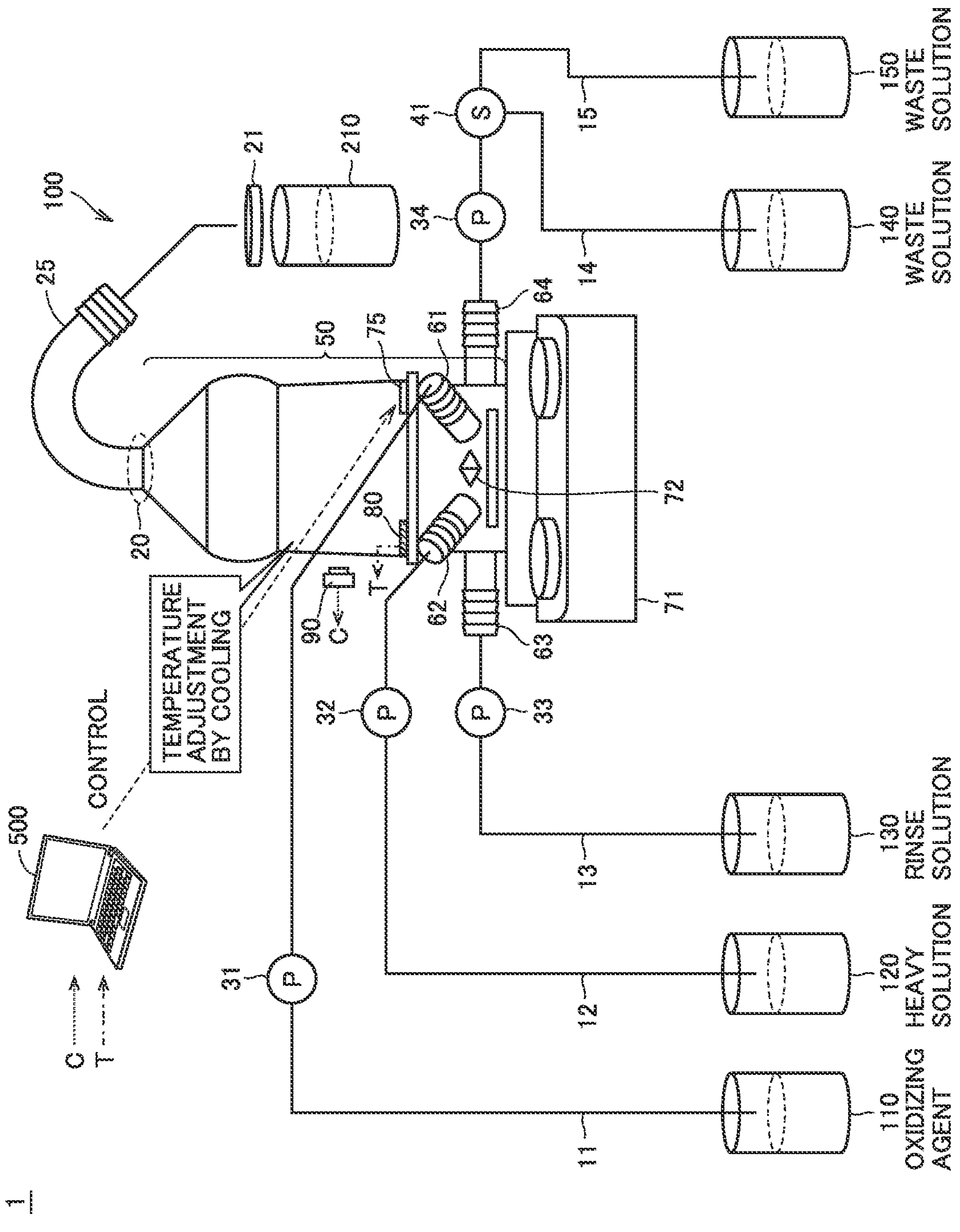
FIG. 8 is a diagram for illustrating the sample purification method with the use of the sample purification apparatus according to the present embodiment.

Then, as shown in FIG. 8, computer 500 controls Peltier element 75 to cool the sample accommodated in container 50 and to adjust the temperature of the sample for expediting oxidation reaction.

Specifically, computer 500 obtains the temperature of the sample measured with temperature sensor 80 as measurement value T. Computer 500 controls Peltier element 75 based on measurement value T obtained from temperature sensor 80 to adjust the temperature of the sample. For example, computer 500 determines whether or not the temperature of the sample in container 50 specified based on measurement value T has attained to a first temperature. The first temperature is a temperature at which oxidation reaction of the sample suitably occurs, and it can be set in advance by the user. When the temperature of the sample has not attained to the first temperature, computer 500 controls Peltier element 75 to cool the sample accommodated in container 50 such that the temperature of the sample attains to the first temperature.

Furthermore, computer 500 obtains a shot image of the sample obtained by shooting with camera 90 as image data C. Computer 500 controls Peltier element 75 based on image data C obtained from camera 90 to adjust the temperature of the sample. For example, computer 500 determines whether or not the sample in container 50 specified based on image data C is in an abnormal state (for example, an excessive boiling state). When the sample is in the abnormal state, computer 500 controls Peltier element 75 to cool the sample accommodated in container 50 to thereby set the sample to a normal state. Computer 500 may determine whether or not the sample is in the abnormal state by determining whether or not a height of a liquid level of the sample exceeds a criterion value set in advance or based on image recognition with the use of artificial intelligence (AI).

Computer 500 may control Peltier element 75 based on at least any one of measurement value T from temperature sensor 80 and image data C from camera 90. In other words, computer 500 may control Peltier element 75 based only on measurement value T from temperature sensor 80, based only on image data C from camera 90, or based on both of measurement value T from temperature sensor 80 and image data C from camera 90.

Figure 9:
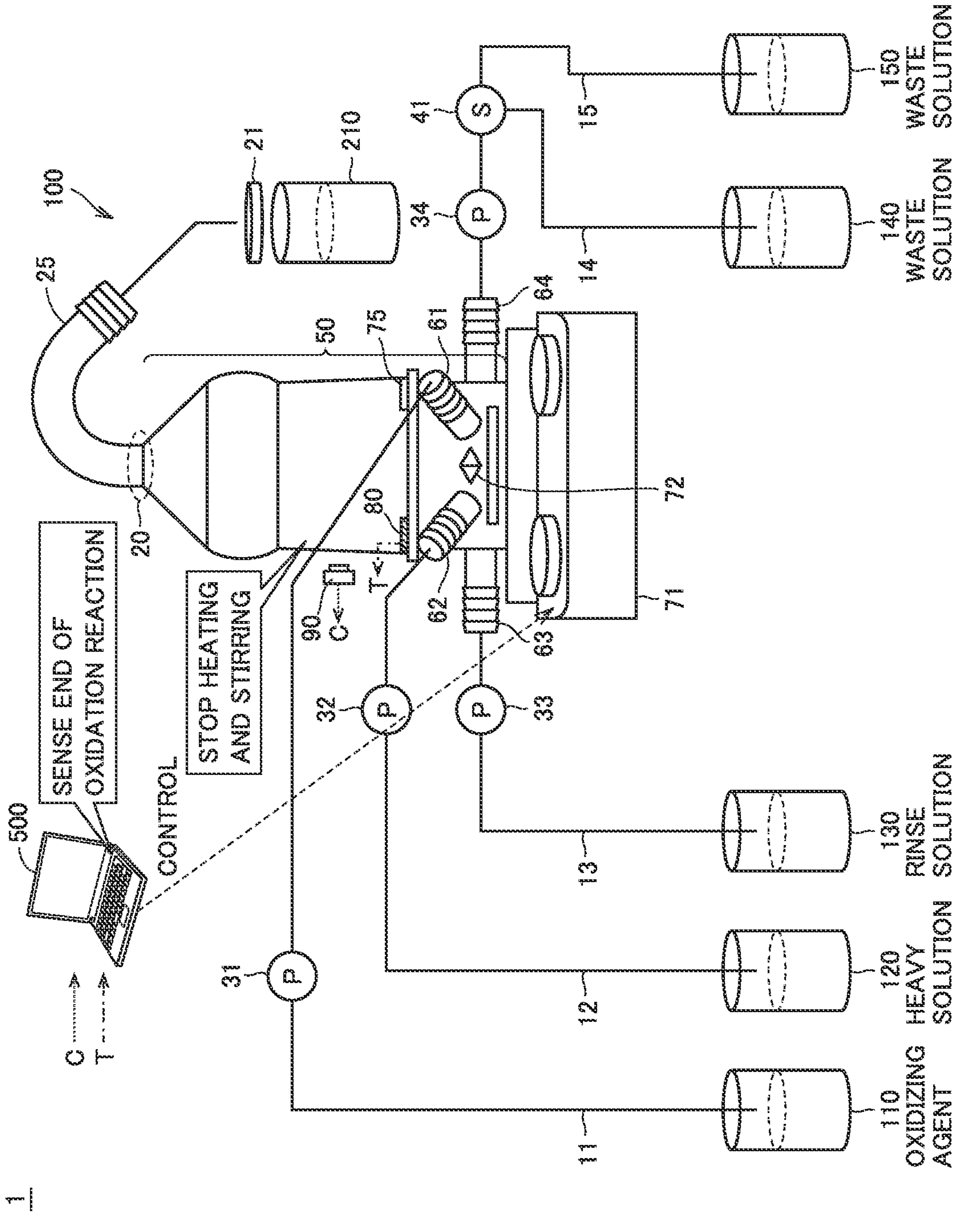
FIG. 9 is a diagram for illustrating the sample purification method with the use of the sample purification apparatus according to the present embodiment.

Then, as shown in FIG. 9, when computer 500 senses completion of oxidation reaction, it controls constant-temperature stirrer 71 to stop heating of the sample accommodated in container 50 and to stop rotation of stirring bar 72.

Specifically, computer 500 obtains the temperature of the sample measured with temperature sensor 80 as measurement value T. Computer 500 controls constant-temperature stirrer 71 based on measurement value T obtained from temperature sensor 80 to stop heating and stirring of the sample. For example, computer 500 determines whether or not the temperature of the sample in container 50 specified based on measurement value T exceeds a second temperature. The second temperature is a temperature at the time of completion of oxidation reaction of the sample, and it can be set in advance by the user. During the oxidation reaction, the temperature of the sample tends to become higher than a heating temperature in heating by constant-temperature stirrer 71 due to heat generation during the oxidation reaction. Therefore, the second temperature can be set to the heating temperature in heating by constant-temperature stirrer 71. When the temperature of the sample is equal to or lower than the second temperature, computer 500 determines that the oxidation reaction of the sample has been completed and controls constant-temperature stirrer 71 to stop heating and stirring of the sample.

Furthermore, computer 500 obtains a shot image of the sample obtained by shooting with camera 90 as image data C. Computer 500 controls constant-temperature stirrer 71 based on image data C obtained from camera 90 to stop heating and stirring of the sample. For example, during the oxidation reaction, the liquid level of the sample tends to be unstable due to boiling caused by heat generation during the oxidation reaction. Computer 500 determines whether or not the sample in container 50 specified based on image data C is in a stable state (for example, a state in which the liquid level of the sample is stable as the oxidation reaction is completed). When the sample is in the stable state, computer 500 determines that the oxidation reaction of the sample has been completed and controls constant-temperature stirrer 71 to stop heating and stirring of the sample. Computer 500 may determine whether or not the sample is in the stable state by determining whether or not the height of the liquid level of the sample exceeds a criterion value set in advance or based on image recognition with the use of artificial intelligence (AI).

Computer 500 may control constant-temperature stirrer 71 based on at least any one of measurement value T from temperature sensor 80 and image data C from camera 90. In other words, computer 500 may control constant-temperature stirrer 71 based only on measurement value T from temperature sensor 80, based only on image data C from camera 90, or based on both of measurement value T from temperature sensor 80 and image data C from camera 90.

Figure 10:
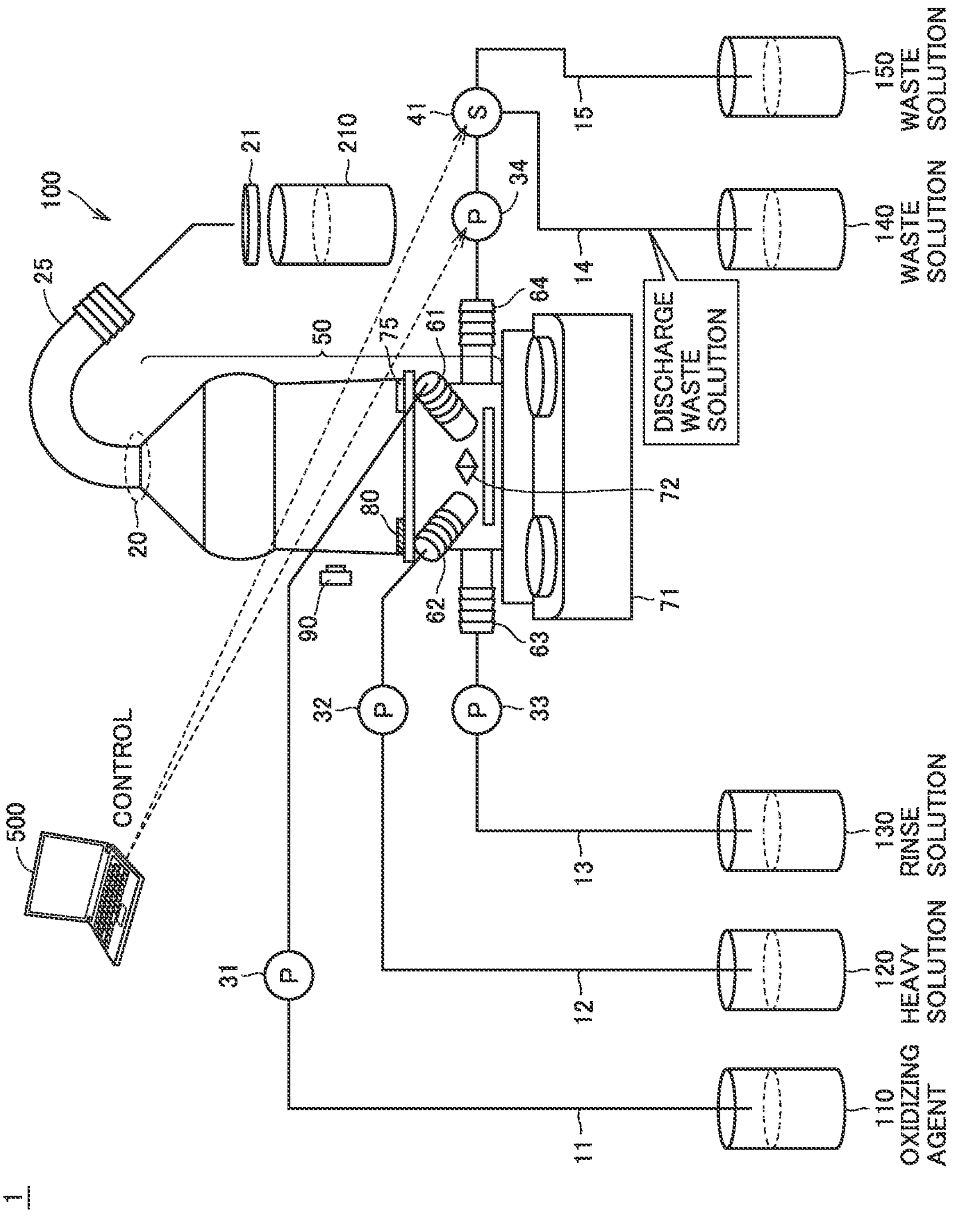
FIG. 10 is a diagram for illustrating the sample purification method with the use of the sample purification apparatus according to the present embodiment.

Then, as shown in FIG. 10, computer 500 controls valve **34*a* and electromagnetic valve 41 to discharge to container 140 through port 64 and pipe 14, the waste solution in container 50 contained in the sample where the organic contaminant has been decomposed. Microplastic to be collected that is contained in the sample, on the other hand, is not discharged to the outside owing to filter 164 included in port 64 but remains in container 50**.

Figure 11:
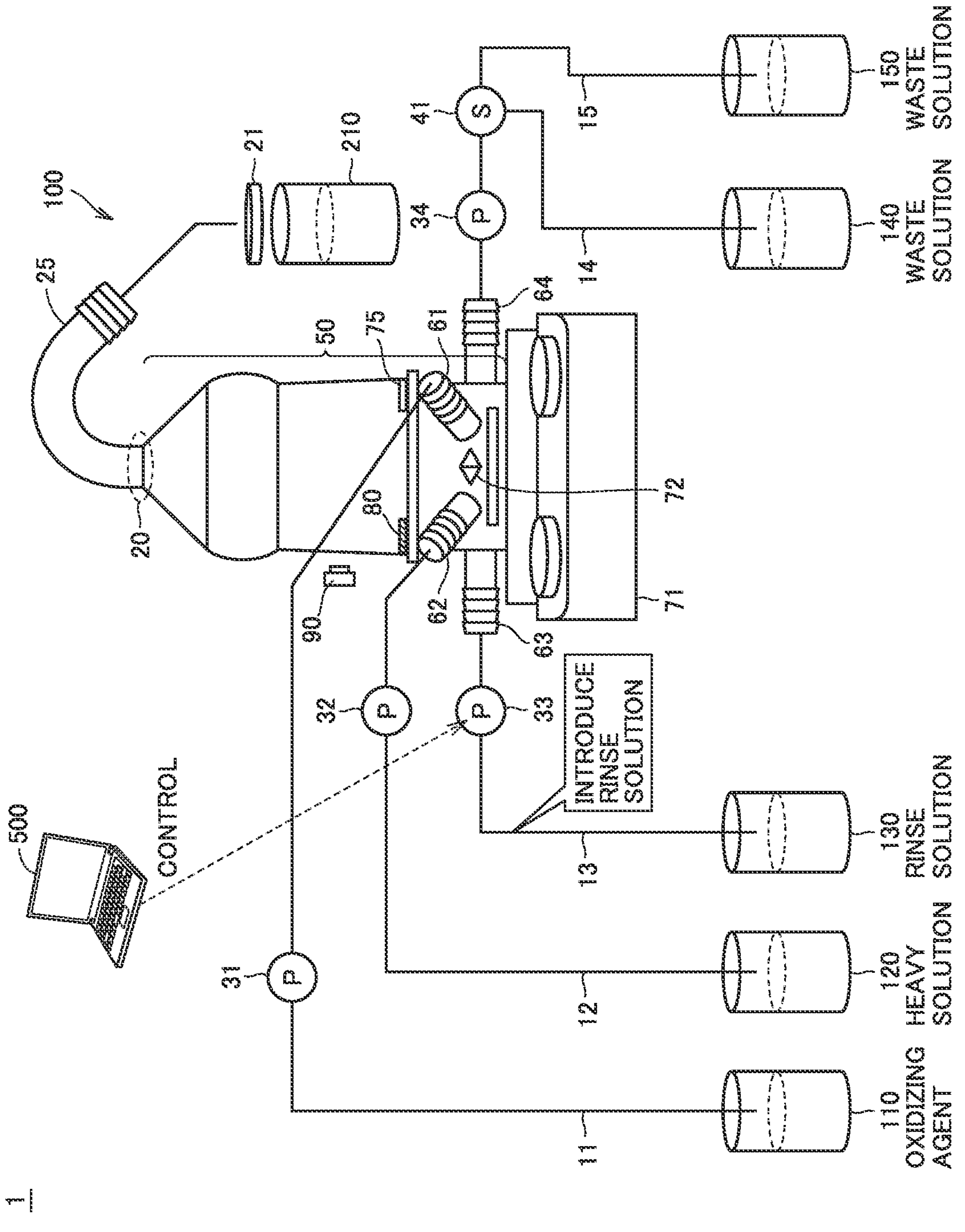
FIG. 11 is a diagram for illustrating the sample purification method with the use of the sample purification apparatus according to the present embodiment.

Then, as shown in FIG. 11, computer 500 controls pump 33 to introduce the rinse solution accommodated in container 130 into container 50 through pipe 13 and port 63. At this time, computer 500 controls the amount of suction by pump 33 to introduce the rinse solution in an amount set in advance by the user into container 50. For example, computer 500 adjusts opening of valve 33*a* to control the amount of suction by pump 33. Alternatively, computer 500 may control the amount of suction by pump 33 based on a detection value from the liquid level sensor provided in container 130 or container 50.

Figure 12:
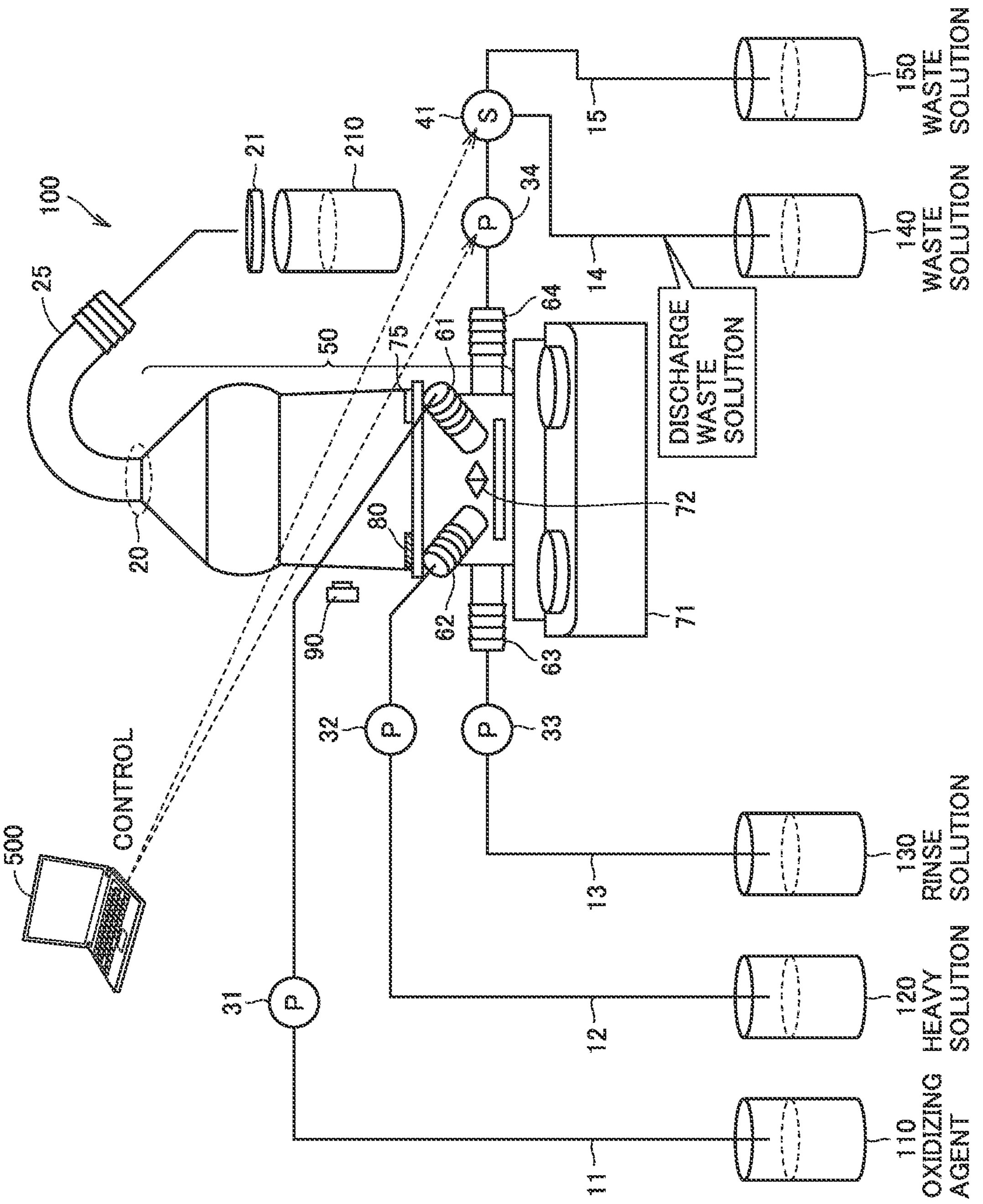
FIG. 12 is a diagram for illustrating the sample purification method with the use of the sample purification apparatus according to the present embodiment.

Then, as shown in FIG. 12, computer 500 controls valve 34*a* and electromagnetic valve 41 to discharge through port 64 and pipe 14 to container 140, the waste solution in container 50 into which the rinse solution has been introduced. The inside of container 50 is thus cleaned with the rinse solution. Microplastic to be collected that is contained in the sample, on the other hand, is not discharged to the outside owing to filter 164 included in port 64 but remains in container 50.

Figure 13:
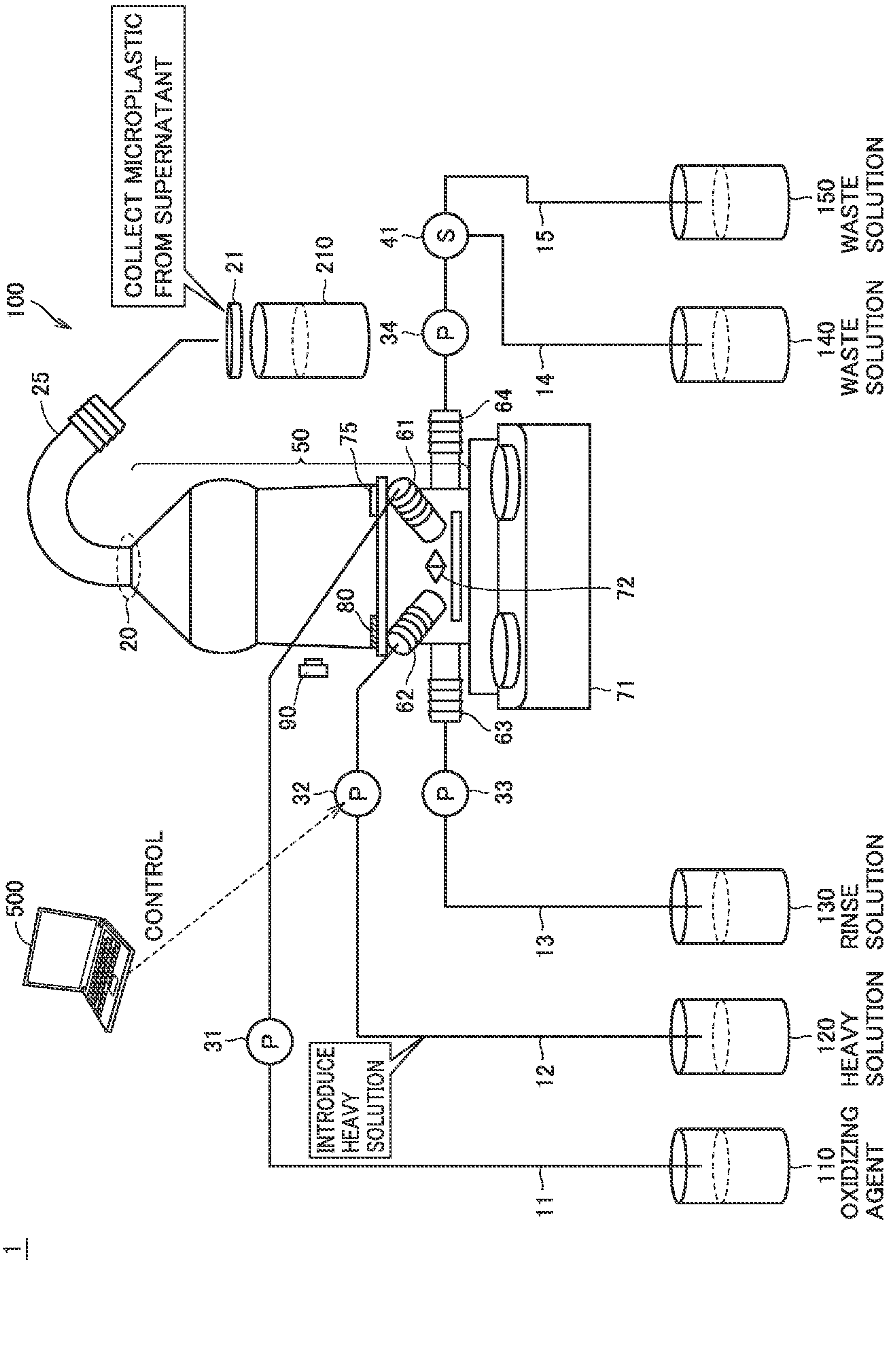
FIG. 13 is a diagram for illustrating the sample purification method with the use of the sample purification apparatus according to the present embodiment.

Thereafter, computer 500 has the sample left as it is for a prescribed time period (for example, for one day) to dry the sample. Then, as shown in FIG. 13, computer 500 controls valve 32*a* to introduce the heavy solution accommodated in container 120 into container 50 through pipe 12 and port 62. At this time, computer 500 controls the amount of suction by pump 32 to introduce the heavy solution in an amount set in advance by the user into container 50. For example, computer 500 adjusts opening of valve 32*a* to control the amount of suction by pump 32. Alternatively, computer 500 may control the amount of suction by pump 32 based on a detection value from a liquid level sensor provided in container 120 or container 50.

As the heavy solution is thus introduced to the sample, an inorganic contaminant contained in the sample settles around the bottom of container 50 owing to a specific gravity difference. The liquid level of the sample separated by gravity gradually rises in container 50 and the supernatant of the sample soon reaches flow-out port 20 of container 50. Then, the supernatant of the sample is flowed out to the outside through flow-out port 20 and flow-out pipe 25. The supernatant of the sample flowed out through flow-out pipe 25 is filtered by detection filter 21, and only the waste solution is collected in container 210. Microplastic which is a component lighter in specific gravity than the heavy solution remains at detection filter 21. Such gravity separation requires approximately one day, and hence computer 500 controls introduction of the heavy solution to the sample during that period.

As set forth above, sample purification apparatus 1 according to the present embodiment can purify the sample through successive works with the use of a single container 50. Specifically, as shown in FIGS. 3 to 13, computer 500 controls sample purification instrument 100 to automatically introduce the oxidizing agent and the heavy solution to the sample accommodated in container 50 at appropriate timing for an appropriate period of time and to discharge the waste solution from container 50. Therefore, the user himself/herself does not have to introduce the oxidizing agent and the heavy solution into container 50 and to discharge the waste solution from container 50. Thus, time and efforts of the user are not required or variation in accuracy in collection of a component depending on skills of each user is unlikely, and the user can accurately purify the sample with time and efforts being minimized.

Figure 14:
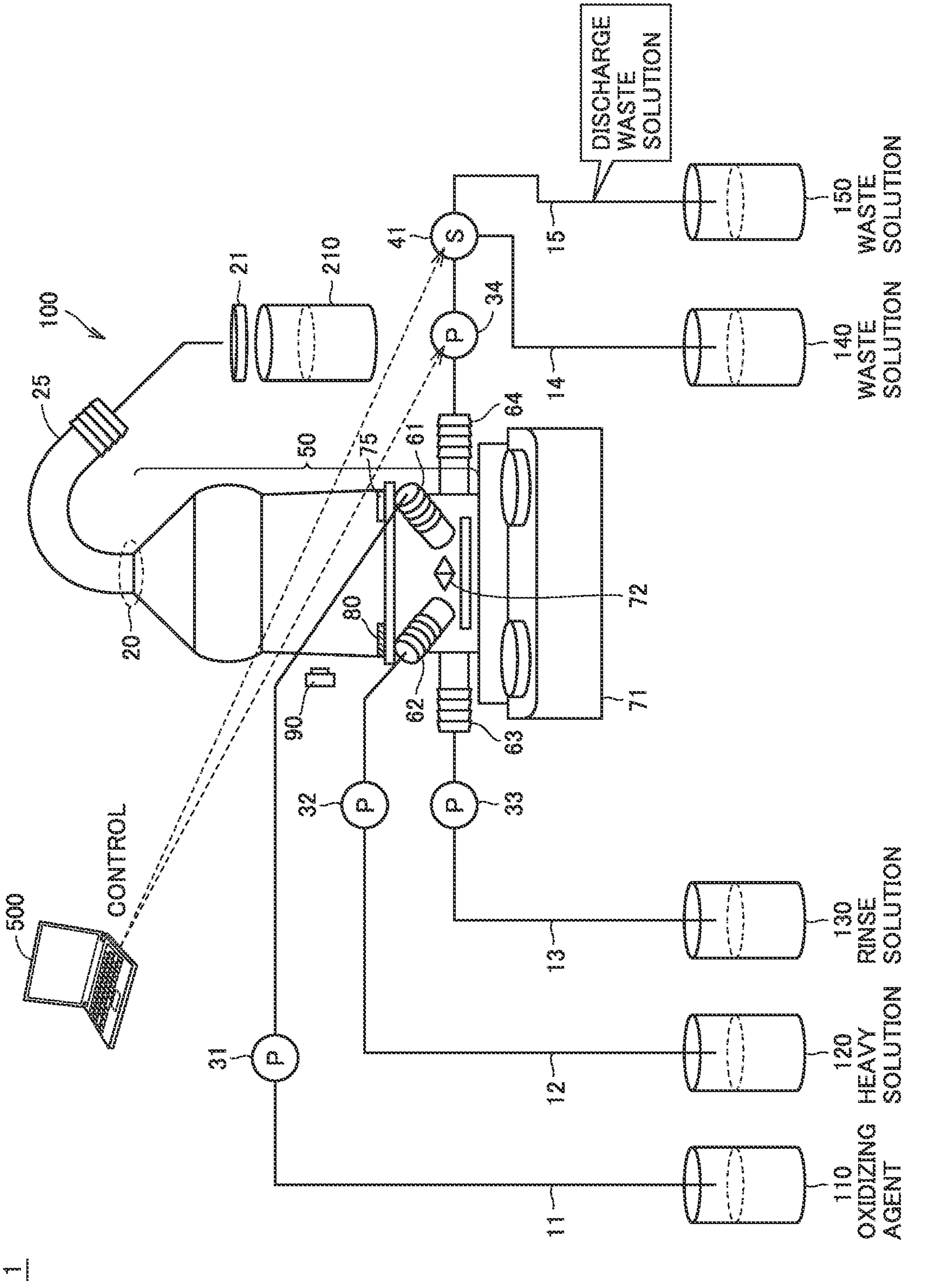
FIG. 14 is a diagram for illustrating the sample purification method with the use of the sample purification apparatus according to the present embodiment.

After microplastic is collected by purification of the sample, container 50 is cleaned in post-treatment. Specifically, as shown in FIG. 14, computer 500 controls valve 34*a* and electromagnetic valve 41 to discharge the waste solution in container 50 from which microplastic has been collected to container 150 through port 64 and pipe 15.

Figure 15:
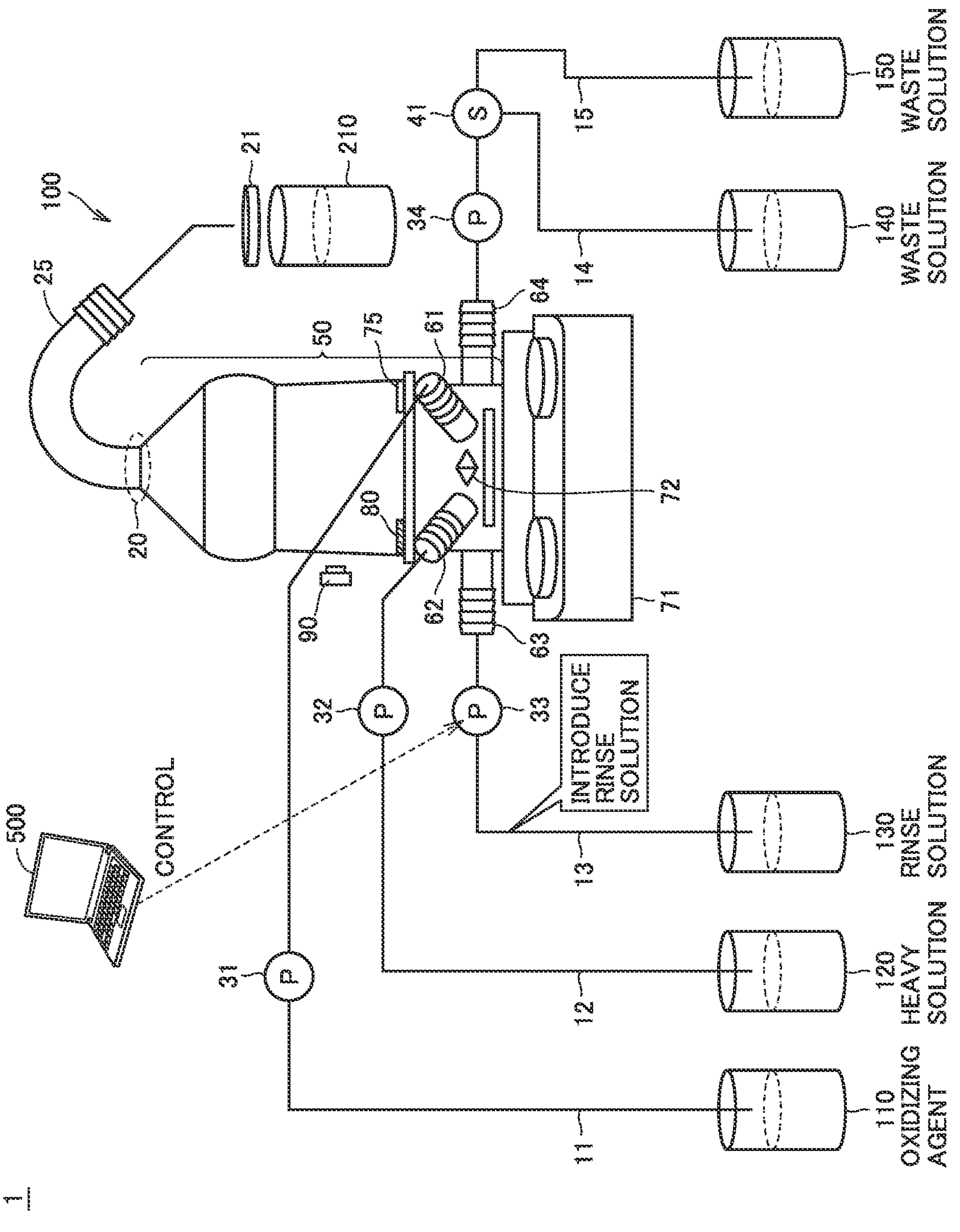
FIG. 15 is a diagram for illustrating the sample purification method with the use of the sample purification apparatus according to the present embodiment.

Then, as shown in FIG. 15, computer 500 controls valve 33*a* to introduce the rinse solution accommodated in container 130 into container 50 through pipe 13 and port 63. At this time, computer 500 controls the amount of suction by pump 33 to introduce the rinse solution in an amount set in advance by the user into container 50. For example, computer 500 adjusts opening of valve 33*a* to control the amount of suction by pump 33. Alternatively, computer 500 may control the amount of suction by pump 33 based on a detection value from the liquid level sensor provided in container 130 or container 50.

Figure 16:
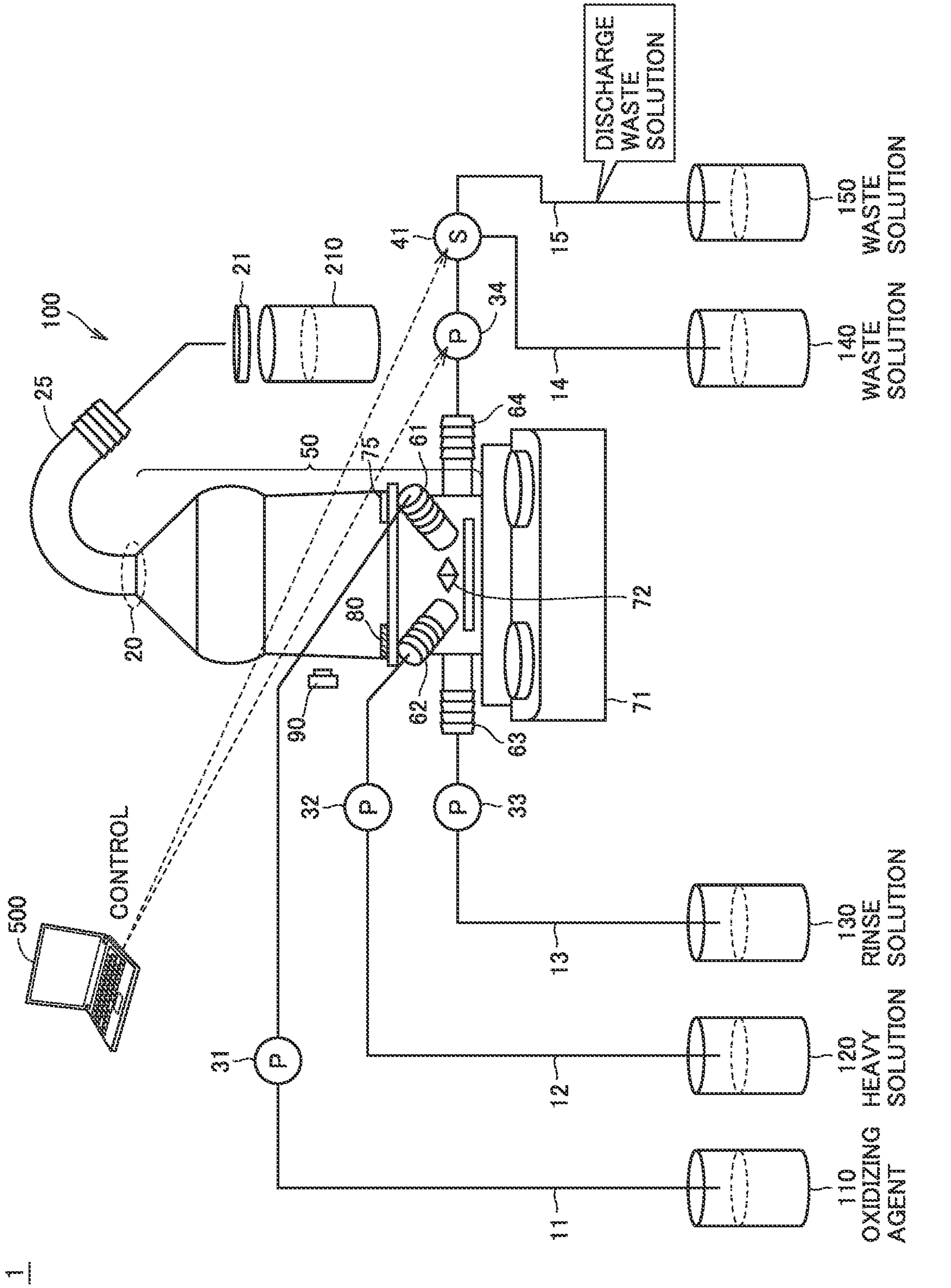
FIG. 16 is a diagram for illustrating the sample purification method with the use of the sample purification apparatus according to the present embodiment.

Then, as shown in FIG. 16, computer 500 controls valve 34*a* and electromagnetic valve 41 to discharge to container 150 through port 64 and pipe 15, the waste solution in container 50 into which the rinse solution has been introduced. The inside of container 50 is thus cleaned with the rinse solution.

As set forth above, according to sample purification apparatus 1 according to the present embodiment, after microplastic is collected, computer 500 controls sample purification instrument 100 to automatically clean used container 50. Therefore, the user himself/herself does not have to clean container 50 so that time and efforts are minimized.

[Sample Purification Processing]

Figure 17:
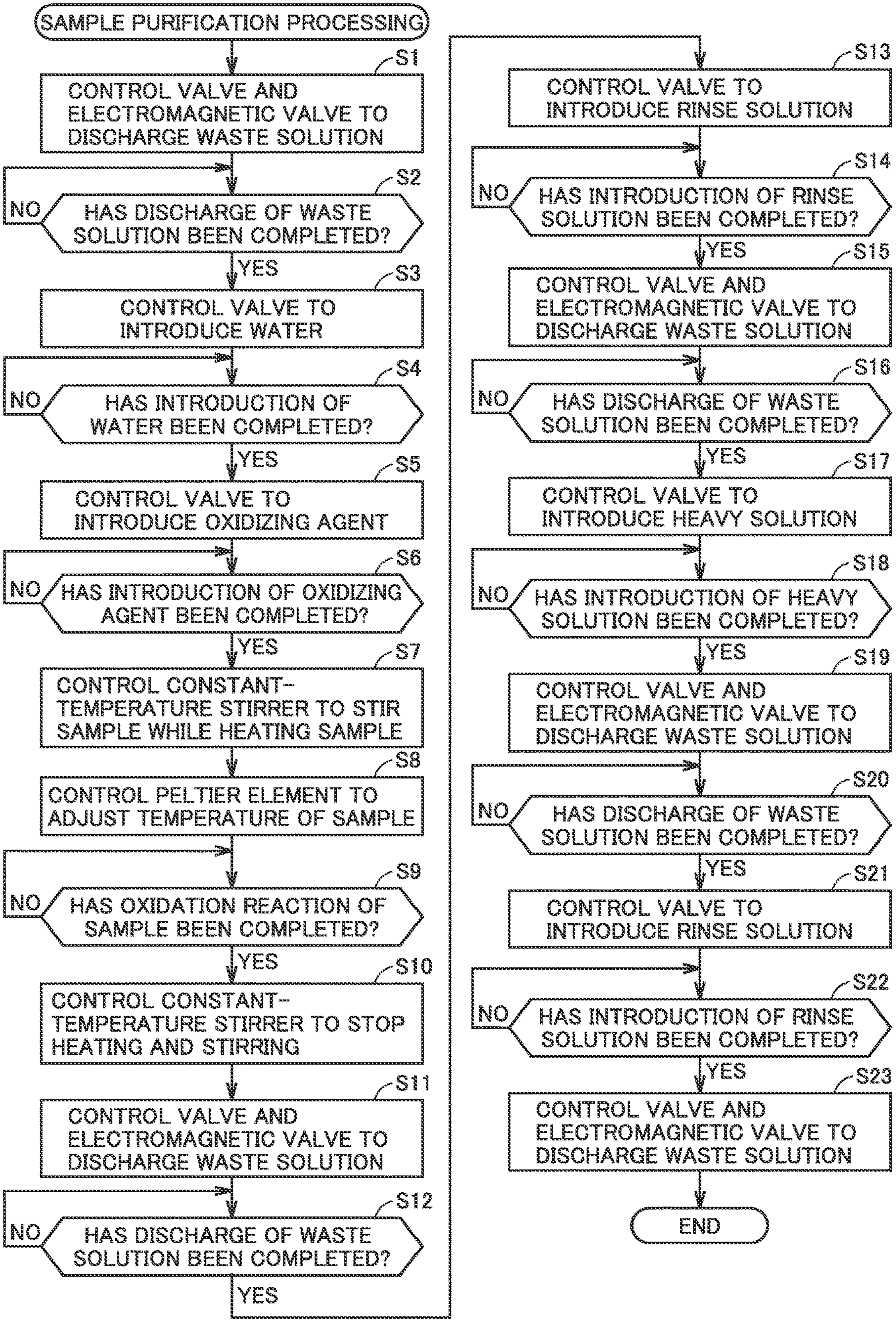
FIG. 17 is a flowchart for illustrating sample purification processing performed by the sample purification apparatus according to the present embodiment.

FIG. 17 is a flowchart for illustrating sample purification processing performed by sample purification apparatus 1 according to the present embodiment. Each step shown in FIG. 17 is performed by execution of OS 513 and control program 511 by computing device 501 of computer 500. "S" in the drawings is used as abbreviation of "STEP".

When computer 500 receives a start operation through input device 505 while the sample is located in container 50 of sample purification apparatus 1, computer 500 performs sample purification processing shown in FIG. 17. As shown in FIG. 17, computer 500 initially controls valve 34*a* and electromagnetic valve 41 to discharge the waste solution in container 50 to container 140 (51).

Then, computer 500 determines whether or not discharge of the waste solution has been completed (S2). For example, computer 500 determines whether or not discharge of the waste solution has been completed based on opening of valve 34*a* or a detection value from the liquid level sensor provided in container 140 or container 50.

When discharge of the waste solution has not been completed (NO in S2), computer 500 repeats processing in S2. When discharge of the waste solution has been completed (YES in S2), computer 500 controls valve 33*a* to introduce water accommodated in container 130 into container 50 (S3).

Then, computer 500 determines whether or not introduction of water has been completed (S4). For example, computer 500 determines whether or not introduction of water has been completed based on opening of valve 33*a* or a detection value from the liquid level sensor provided in container 130 or container 50.

When introduction of water has not been completed (NO in S4), computer 500 repeats processing in S4. When introduction of water has been completed (YES in S4), computer 500 controls valve 31*a* to introduce the oxidizing agent accommodated in container 110 into container 50 (S5).

Then, computer 500 determines whether or not introduction of the oxidizing agent has been completed (S6). For example, computer 500 determines whether or not introduction of the oxidizing agent has been completed based on opening of valve 31*a* or a detection value from the liquid level sensor provided in container 110 or container 50.

When introduction of the oxidizing agent has not been completed (NO in S6), computer 500 repeats processing in S6. When introduction of the oxidizing agent has been completed (YES in S6), computer 500 controls constant-temperature stirrer 71 to stir the sample with stirring bar 72 while constant heat is applied to the sample (S7).

Then, computer 500 controls Peltier element 75 based on at least any one of measurement value T from temperature sensor 80 and image data C from camera 90 to cool the sample accommodated in container 50 and to adjust the temperature of the sample for expediting the oxidation reaction.

Then, computer 500 determines whether or not the oxidation reaction of the sample has been completed (S9). For example, computer 500 determines whether or not the oxidation reaction of the sample has been completed based on at least any one of measurement value T from temperature sensor 80 and image data C from camera 90. Computer 500 may determine whether or not the oxidation reaction of the sample has been completed based on a count value from a timer (not shown).

When the oxidation reaction of the sample has not been completed (NO in S9), computer 500 repeats processing in S9. When the oxidation reaction of the sample has been completed (YES in S9), computer 500 controls constant-temperature stirrer 71 to stop heating and stirring of the sample (S10). Thereafter, computer 500 controls valve 34*a* and electromagnetic valve 41 to discharge to container 140, the waste solution in container 50 contained in the sample in which the organic contaminant has been decomposed (S11).

Then, computer 500 determines whether or not discharge of the waste solution has been completed (S12). For example, computer 500 determines whether or not discharge of the waste solution has been completed based on opening of valve 34*a* or a detection value from the liquid level sensor provided in container 140 or container 50.

When discharge of the waste solution has not been completed (NO in S12), computer 500 repeats processing in S12. When discharge of the waste solution has been completed (YES in S12), computer 500 controls valve 33*a* to introduce the rinse solution accommodated in container 130 into container 50 (S13).

Then, computer 500 determines whether or not introduction of the rinse solution has been completed (S14). For example, computer 500 determines whether or not introduction of the rinse solution has been completed based on opening of valve 33*a* or a detection value from the liquid level sensor provided in container 130 or container 50.

When introduction of the rinse solution has not been completed (NO in S14), computer 500 repeats processing in S14. When introduction of the rinse solution has been completed (YES in S14), computer 500 controls valve 34*a* and electromagnetic valve 41 to discharge the waste solution in container 50 into which the rinse solution has been introduced to container 140 (S15).

Then, computer 500 determines whether or not discharge of the waste solution has been completed (S16). For example, computer 500 determines whether or not discharge of the waste solution has been completed based on opening of valve 34*a* or a detection value from the liquid level sensor provided in container 140 or container 50.

When discharge of the waste solution has not been completed (NO in S16), computer 500 repeats processing in S16. When discharge of the waste solution has been completed (YES in S16), computer 500 controls valve 32*a* to introduce the heavy solution accommodated in container 120 into container 50 (S17).

Then, computer 500 determines whether or not introduction of the heavy solution has been completed (S18). For example, computer 500 determines whether or not introduction of the heavy solution has been completed based on opening of valve 32*a* or a detection value from the liquid level sensor provided in container 120 or container 50.

When introduction of the heavy solution has not been completed (NO in S18), computer 500 repeats processing in S18.

As the heavy solution is thus introduced, an inorganic contaminant contained in the sample settles around the bottom of container 50 owing to the specific gravity difference, while the supernatant of the sample is flowed out to the outside through flow-out port 20 and flow-out pipe 25. Then, the supernatant of the sample flowed out through flow-out pipe 25 is filtered through detection filter 21, which collects microplastic.

When introduction of the heavy solution has been completed (YES in S18), that is, after microplastic is collected by gravity separation over approximately one day, computer 500 controls valve 34*a* and electromagnetic valve 41 to discharge the waste solution in container 50 from which microplastic has been collected to container 150 (S19).

Then, computer 500 determines whether or not discharge of the waste solution has been completed (S20). For example, computer 500 determines whether or not discharge of the waste solution has been completed based on opening of valve 34*a* or a detection value from a liquid level sensor provided in container 150 or container 50.

When discharge of the waste solution has not been completed (NO in S20), computer 500 repeats processing in S20. When discharge of the waste solution has been completed (YES in S20), computer 500 controls valve 33*a* to introduce the rinse solution accommodated in container 130 into container 50 (S21).

Then, computer 500 determines whether or not introduction of the rinse solution has been completed (S22). For example, computer 500 determines whether or not introduction of the rinse solution has been completed based on opening of valve 33*a* or a detection value from the liquid level sensor provided in container 130 or container 50.

When introduction of the rinse solution has not been completed (NO in S22), computer 500 repeats processing in S22. When introduction of the rinse solution has been completed (YES in S22), computer 500 controls valve 34*a* and electromagnetic valve 41 to discharge the waste solution in container 50 into which the rinse solution has been introduced to container 150 (S23) and quits the present process.

Through such post-treatment as introduction of the rinse solution and discharge of the waste solution, the inside of container 50 is cleaned.

As set forth above, according to sample purification apparatus 1 according to the present embodiment, as computer 500 executes control program 511, the oxidizing agent and the heavy solution are automatically introduced to the sample accommodated in container 50 and the waste solution is discharged from container 50 at appropriate timing for an appropriate period of time. Therefore, the user himself/herself does not have to introduce the oxidizing agent and the heavy solution into container 50 and to discharge the waste solution from container 50. Time and efforts of the user are not required or variation in accuracy in collection of a component depending on skills of each user is unlikely, and the user can accurately purify the sample with time and efforts being minimized.

Furthermore, according to sample purification apparatus 1 according to the present embodiment, computer 500 executes control program 511 to automatically clean used container 50 after microplastic is collected. Therefore, the user himself/herself does not have to clean container 50 so that time and efforts are minimized.

[Shape of Container of Sample Purification Apparatus]

Figure 18:
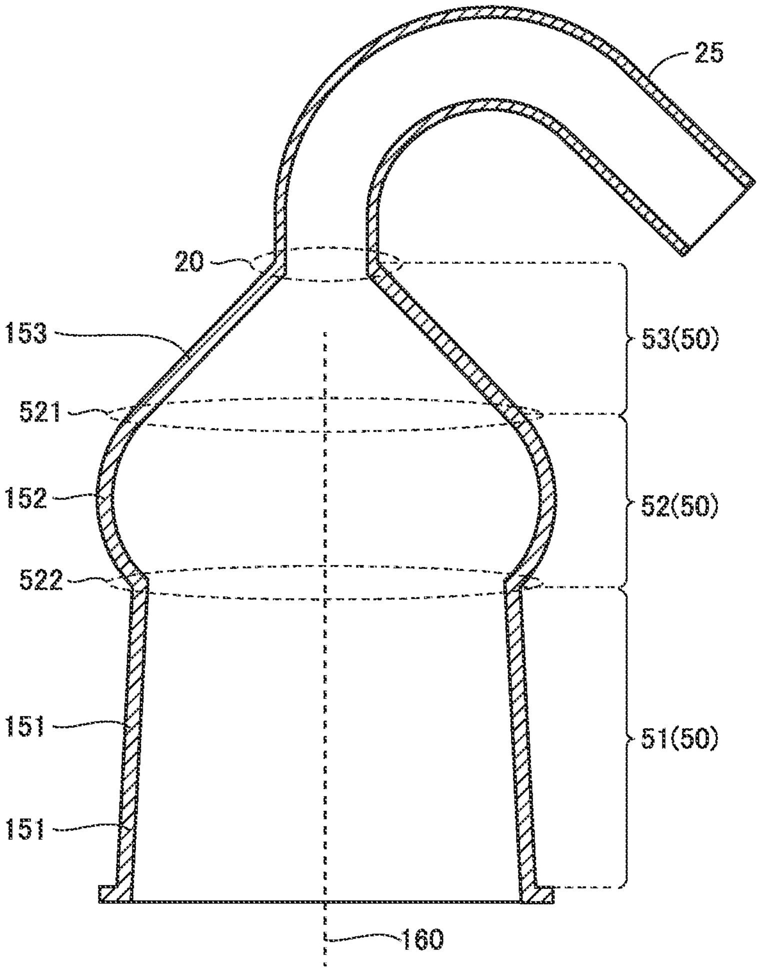
FIG. 18 is a diagram for illustrating a shape of a container in the sample purification apparatus according to the present embodiment.
Figure 19:
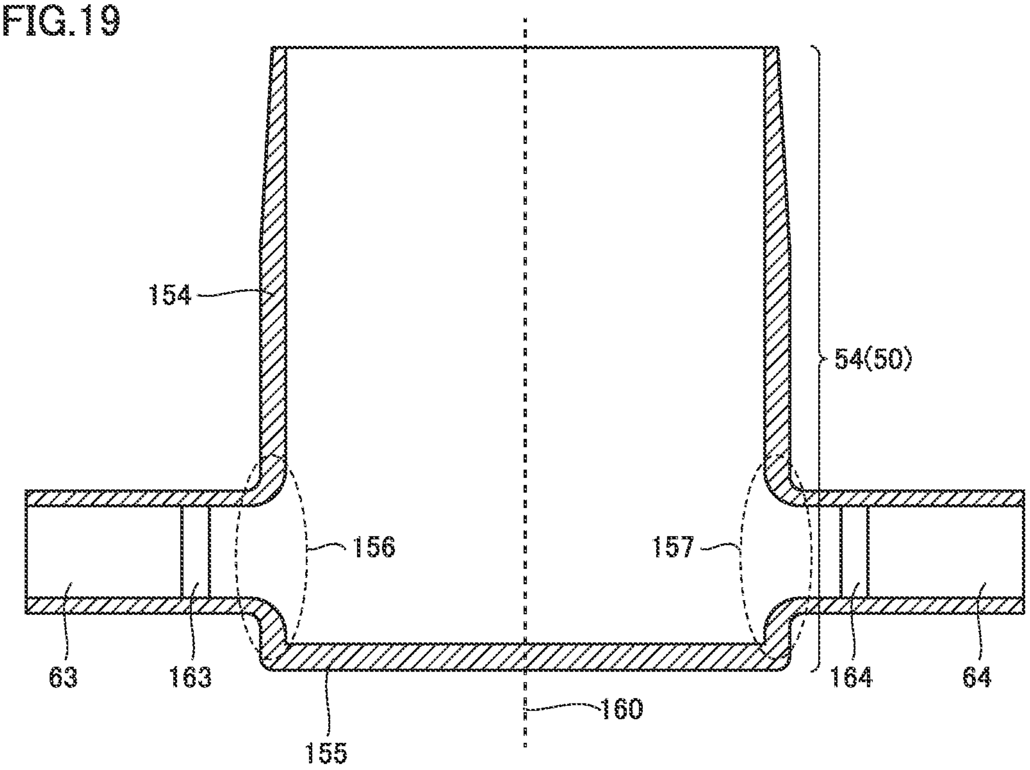
FIG. 19 is a diagram for illustrating the shape of the container in the sample purification apparatus according to the present embodiment.

FIGS. 18 and 19 are diagrams for illustrating a shape of container 50 in sample purification apparatus 1 according to the present embodiment. As described above, in sample purification apparatus 1, the sample can be purified with the use of container 50 in sample purification instrument 100. The shape of container 50 is devised to accurately purify the sample.

Specifically, as shown in FIGS. 18 and 19, container 50 includes main body portions 51 to 54. Main body portion 51 represents an exemplary "first main body portion." Main body portion 52 represents an exemplary "second main body portion." Main body portion 53 represents an exemplary "third main body portion."

Main body portion 54 is located at a lowermost portion of the container and includes a bottom surface 155 and a side surface 154. Side surface 154 of main body portion 54 is formed to surround a central axis 160 of columnar container 50, and in a part thereof, a hole 156 leading to port 63 and a hole 157 leading to port 64 are provided. In the inside of port 63, filter 163 is provided. In the inside of port 64, filter 164 is provided. Each of port 63 (hole 156) and port 64 (hole 157) is provided at a position below a central portion of main body portion 54 and in a portion close to bottom surface 155. Though not shown, a filter is provided also in the inside of each of other ports 61 and 62.

Main body portion 51 is provided above main body portion 54 and includes a side surface 151 formed as being contiguous to side surface 154 of main body portion 54. Side surface 151 is formed to surround central axis 160 of container 50 and to increase in diameter downward (toward bottom surface 155) from an upper side of container 50 (a side of flow-out port 20).

Main body portion 52 is provided above main body portion 51 and includes a side surface 152 formed as being contiguous to side surface 151 of main body portion 51. Side surface 152 is formed to surround central axis 160 of container 50 and to expand from an upper portion 521 and a lower portion 522 of main body portion 52 toward a portion located between upper portion 521 and lower portion 522. In other words, side surface 152 is formed to expand from central axis 160 of container 50 toward an outer circumferential side of main body portion 52. From another point of view, a horizontal cross-sectional area (or an inner diameter) of main body portion 52 is constructed to continuously increase from each of upper portion 521 and lower portion 522 of main body portion 52 toward the portion located between upper portion 521 and lower portion 522.

Main body portion 53 is provided above main body portion 52 and includes a side surface 153 formed as being contiguous to side surface 152 of main body portion 52. Side surface 153 is formed to surround central axis 160 of container 50 and to be tapered upward (the side of flow-out port 20) from a lower side of container 50 (a side of bottom surface 155). From another point of view, a horizontal cross-sectional area (or an inner diameter) of main body portion 53 is constructed to continuously decrease in an upward direction where flow-out port 20 is located. The horizontal cross-sectional area (or the inner diameter) of container 50 is thus constructed to continuously decrease upward between at least a prescribed height of container 50 (in this example, a height where upper portion 521 of main body portion 52 is located) and flow-out port 20. Though side surface 153 of main body portion 53 is linear in the present embodiment, it may be curved, and the horizontal cross-sectional area (or the inner diameter) of main body portion 53 should only be constructed to continuously decrease in the upward direction where flow-out port 20 is located.

Flow-out port 20 is a hole which is provided at a position opposed to bottom surface 155 of container 50, as being contiguous to side surface 153 of container 50, and leads to flow-out pipe 25. Flow-out port 20 is smaller in horizontal cross-sectional area (or inner diameter) than each of upper portion 521 and lower portion 522 of main body portion 52.

Main body portion 53 is formed as being integrated with main body portion 52. Main body portion 52 and main body portion 51 can be separated from each other, and the user can open container 50 by separating main body portion 52 from main body portion 51 to feed the sample into container 50.

As set forth above, according to sample purification apparatus 1 according to the present embodiment, side surface 153 of a part of container 50 is formed as being tapered from the side of bottom surface 155 toward flow-out port 20. In other words, the horizontal cross-sectional area of container 50 is constructed to continuously decrease upward between the at least prescribed height of container 50 and flow-out port 20. Therefore, a boundary between side surface 153 of container 50 and flow-out port 20 can be smoothened as much as possible. Thus, in flowing out of the supernatant of the sample separated by gravity with the use of the heavy solution to the outside through flow-out port 20, retention of microplastic in container 50 can be prevented as much as possible. For example, when the boundary between the side surface of container 50 and flow-out port 20 is not smooth but square-cornered, the supernatant of the sample separated by gravity with the use of the heavy solution may impinge on the square-cornered portion and microplastic to be collected may adhere to the inside of container 50, and the microplastic may be retained in container 50 without moving to flow-out port 20. In contrast, the boundary between side surface 153 of container 50 and flow-out port 20 is smoothened as much as possible as in container 50 according to the present embodiment, so that adhesion and retention of microplastic in container 50 can be prevented as much as possible. Therefore, the user can accurately purify the sample.

Since side surface 152 in a part of container 50 is formed to expand from upper portion 521 and lower portion 522 toward the portion located between upper portion 521 and lower portion 522, adhesion and retention of microplastic in container 50 can be prevented as much as possible. Furthermore, side surface 152 of the part (main body portion 52) of container 50 once expands, and additionally thereabove, the horizontal cross-sectional area of the part (main body portion 53) of container 50 continuously decreases toward flow-out port 20. Therefore, the supernatant of the sample that has risen by introduction of the heavy solution can spread in main body portion 52, and thereafter, owing to the tapered portion of main body portion 53, the supernatant can be directed to flow-out port 20 with great strength.

Since tapered main body portion 53 and main body portion 52 formed to expand are formed as being integrated with each other, strength of container 50 can be enhanced. Furthermore, since there is no boundary between main body portion 53 and main body portion 52, the supernatant of the sample that has risen owing to introduction of the heavy solution does not adhere to the boundary between main body portion 53 and main body portion 52 and the supernatant can more efficiently be directed to flow-out port 20.

[Analysis System]

Figure 20:
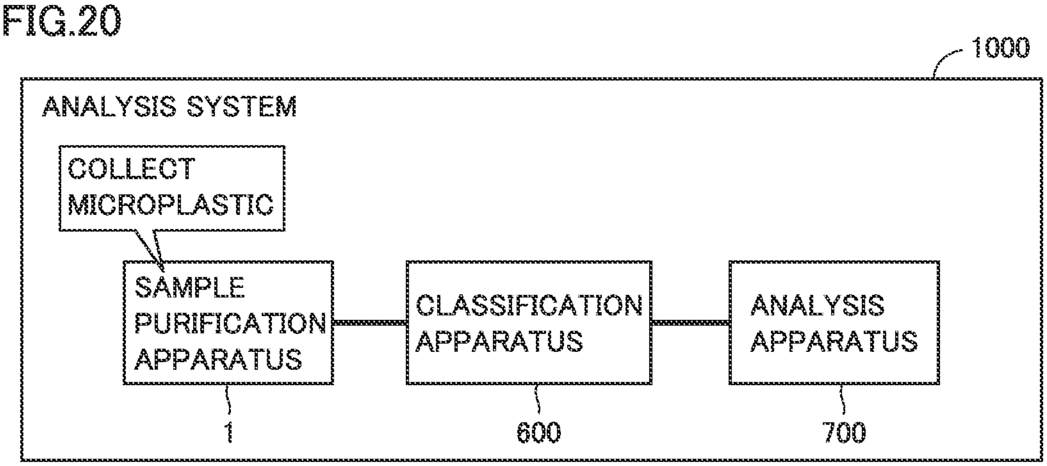
FIG. 20 is a diagram schematically showing an analysis system according to the present embodiment.

FIG. 20 is a diagram schematically showing an analysis system 1000 according to the present embodiment. Analysis system 1000 includes sample purification apparatus 1 according to the present embodiment described above, a classification apparatus 600, and an analysis apparatus 700.

Classification apparatus 600 classifies microplastic collected by sample purification apparatus 1 for each size of particles. An exemplary classification apparatus 600 includes a field flow fractionation apparatus that classifies particles with the use of centrifugation.

Analysis apparatus 700 analyzes microplastic classified by classification apparatus 600. As an analysis result obtained by analysis apparatus 700 is shown on a screen (not shown), a user obtains the analysis result.

In analysis system 1000 configured as described above, under the control by computer 500, sample purification apparatus 1 collects microplastic, and thereafter classification apparatus 600 classifies microplastic and analysis apparatus 700 analyzes the microplastic.

As set forth above, according to analysis system 1000 according to the present embodiment, since a series of works from introduction of the sample into sample purification apparatus 1 until analysis of microplastic by analysis apparatus 700 is automated by control by computer 500, convenience of the user is improved.

Analysis system 1000 does not have to include classification apparatus 600, and analysis apparatus 700 may directly obtain microplastic collected by sample purification apparatus 1 and then analyze the same.

[Modification]

Though sample purification apparatus 1 and analysis system 1000 according to the present embodiment are described above, the configuration thereof can further variously be modified and applied. A modification will be described below.

Figure 21:
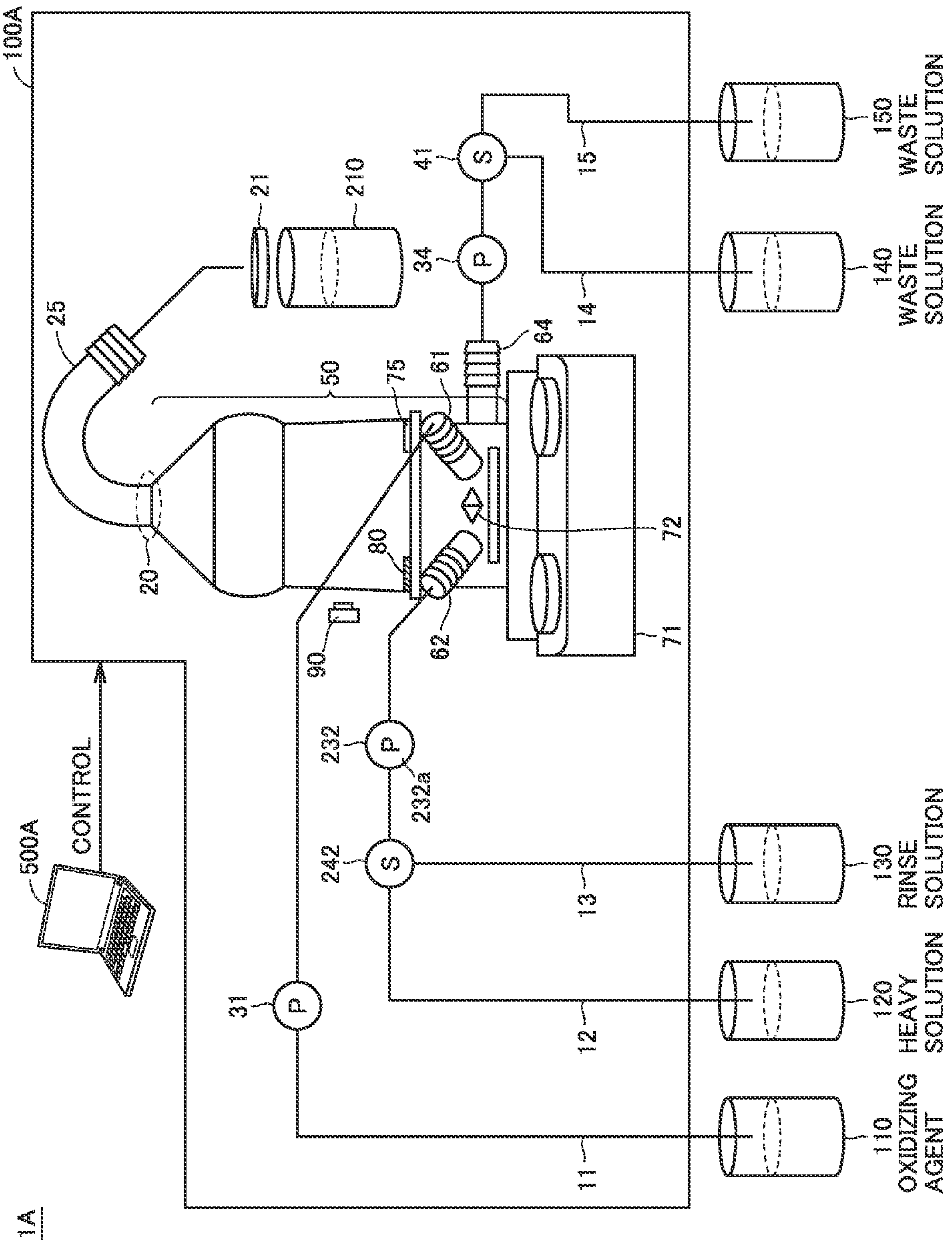
FIG. 21 is a diagram schematically showing a sample purification apparatus according to a second embodiment.

FIG. 21 is a diagram schematically showing a sample purification apparatus 1A according to a second embodiment. As shown in FIG. 21, in a sample purification instrument 100A of sample purification apparatus 1A, through pipe 12 for introduction of the heavy solution and pipe 13 for introduction of the rinse solution, solutions may be introduced to port 62 common therebetween.

Specifically, a pump 232 (a valve 232*a*) and an electromagnetic valve 242 are provided between each of pipes 12 and 13 and port 62 of container 50. Electromagnetic valve 242 operates under the control by a computer 500A to switch a path for passage of a solution between a path between pipe 12 and pump 232 and a path between pipe 13 and pump 232.

Thus, the heavy solution suctioned from container 120 through pipe 12 is introduced to port 62 through electromagnetic valve 242 and pump 232. The rinse solution suctioned from container 130 through pipe 13 is introduced to port 62 through electromagnetic valve 242 and pump 232.

As set forth above, according to sample purification apparatus 1A according to the second embodiment, pump 232 (valve 232*a*) provided between pipe 12 and port 62 of container 50 is identical to pump 232 (valve 232*a*) provided between pipe 13 and port 62 of container 50, so that the number of parts of sample purification apparatus 1A can be reduced and cost can be suppressed.

Figure 22:
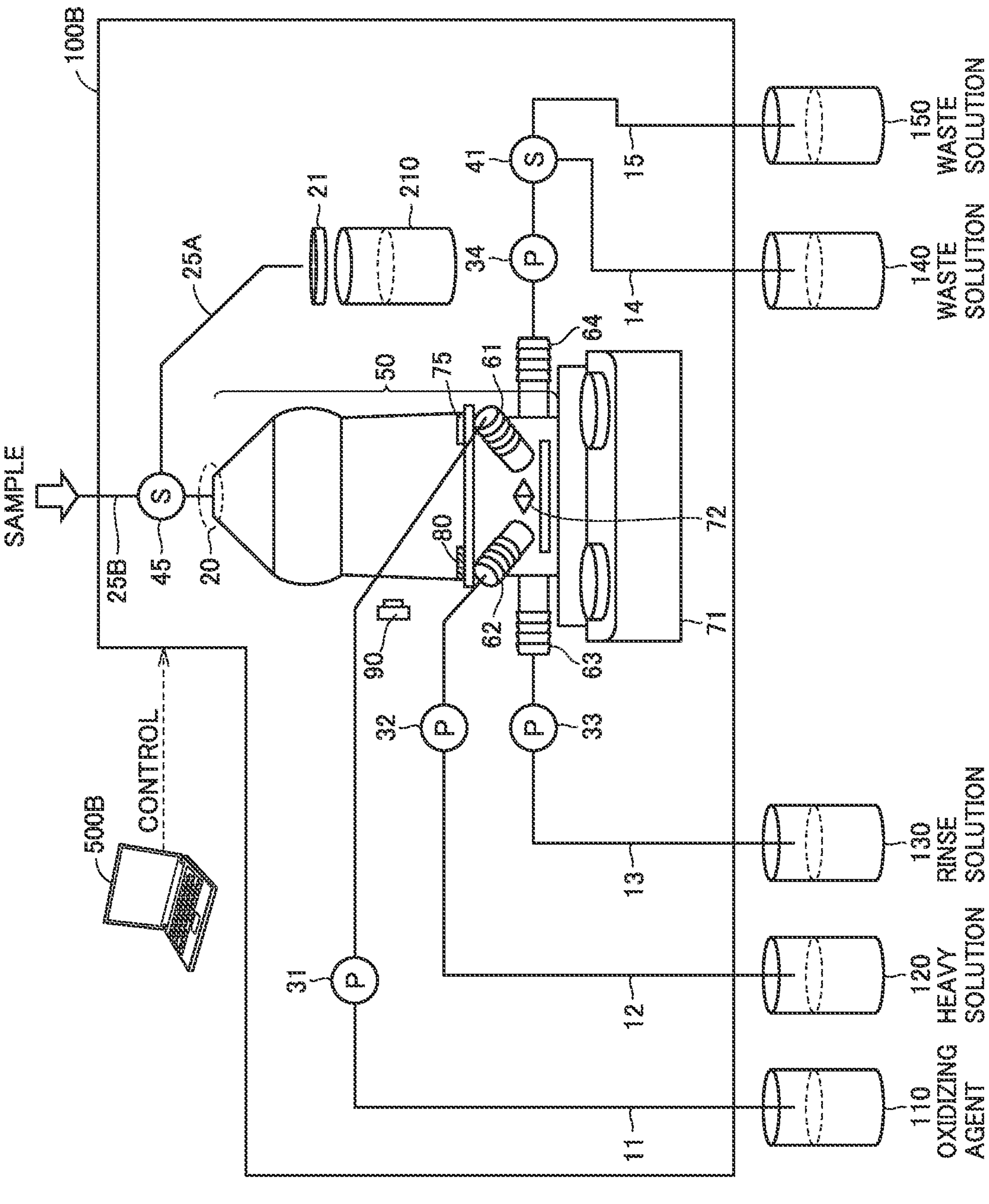
FIG. 22 is a diagram schematically showing a sample purification apparatus according to a third embodiment.

FIG. 22 is a diagram schematically showing a sample purification apparatus 1B according to a third embodiment. As shown in FIG. 22, a sample purification instrument 100B of sample purification apparatus 1B may be constructed to introduce a sample from above container 50.

Specifically, sample purification instrument 100B includes a flow-out pipe 25A through which the supernatant of the sample that overflows container 50 is flowed out toward detection filter 21 and an introduction pipe 25B through which the sample containing microplastic is introduced from the outside into container 50. Flow-out pipe 25A represents an exemplary "flow-out path" and introduction pipe 25B represents an exemplary "introduction path." An electromagnetic valve 45 is provided between each of flow-out pipe 25A and introduction pipe 25B and flow-out port 20 of container 50. Electromagnetic valve 45 operates under the control by a computer 500B to switch a path for passage of a solution between a path between flow-out pipe 25A and flow-out port 20 and a path between introduction pipe 25B and flow-out port 20.

Thus, under the control by computer 500B, the supernatant of the sample that overflows container 50 is flowed out to detection filter 21 through electromagnetic valve 45 and flow-out pipe 25A. Under the control by computer 500B, an externally introduced sample is introduced into container 50 through introduction pipe 25B and electromagnetic valve 45.

As set forth above, according to sample purification apparatus 1B according to the third embodiment, the sample can be introduced from above container 50 by making use of flow-out port 20, so that more convenient sample purification apparatus 1B can be provided to the user.

According to the present embodiment, as shown in FIG. 17, before the oxidizing agent is introduced into container 50 in S5, water is introduced in advance into container 50 in S3. In the sample purification apparatus according to the modification, however, computer 500 may control valve 31*a* in the processing in S5 without performing the processing in S3 and S4, to introduce the oxidizing agent accommodated in container 110 into container 50 by a prescribed amount in constant cycles. In other words, in order to avoid abrupt mixing of the sample accommodated in container 50 with the oxidizing agent, the sample purification apparatus according to the modification may introduce the oxidizing agent little by little to the sample accommodated in container 50. Abrupt reaction of the sample accommodated in container 50 with the oxidizing agent can thus be avoided as much as possible.

When computer 500 determines that progress of the oxidation reaction of the sample is insufficient based on measurement value T obtained from temperature sensor 80, it may control valve 31*a* to additionally introduce the oxidizing agent accommodated in container 110 into container 50.

When computer 500 determines that progress of the oxidation reaction of the sample is insufficient based on an image shot with camera 90, it may control valve 31*a* to additionally introduce the oxidizing agent accommodated in container 110 into container 50.

[Aspects]

Illustrative embodiments described above are understood by a person skilled in the art as specific examples of aspects below.

(Clause 1) A sample purification apparatus that purifies a mixed sample according to one aspect includes a container for separating, with a heavy solution, the mixed sample based on a specific gravity difference, a first pipe for introduction into the container, of an oxidizing agent for treatment of a contaminant contained in the mixed sample, a second pipe for introduction of the heavy solution into the container, a flow-out portion arranged so that a supernatant of a solution in the container due to the introduction of the heavy solution is flowed out to the outside of the container, a collector that collects a component in the mixed sample, the component being lighter in specific gravity than the heavy solution by receiving of the supernatant flowed out from the flow-out portion, at least one switching unit provided in the first pipe and the second pipe, the at least one switching unit configured to switch between entry and exit of a solution, and a control unit that controls the at least one switching unit.

According to the sample purification apparatus described in Clause 1, since the mixed sample can be purified through successive works with the use of a single container, the mixed sample can accurately be purified with time and efforts of a user such as a worker being minimized.

(Clause 2) The sample purification apparatus described in Clause 1 includes a third pipe for discharge of a waste solution in the container and at least one switching unit provided in the third pipe, the at least one switching unit switching between entry and exit of a solution. The control unit controls the at least one switching unit provided in the first pipe, the second pipe, and the third pipe to introduce the oxidizing agent through the first pipe into the container where the mixed sample is accommodated, to discharge through the third pipe, the waste solution in the container resulting from treatment of the contaminant with the oxidizing agent, and to introduce the heavy solution through the second pipe into the container.

According to the sample purification apparatus described in Clause 2, since the mixed sample can be purified by control of the switching unit by the control unit, the mixed sample can accurately be purified with time and efforts of the user being minimized.

(Clause 3) In the sample purification apparatus described in Clause 2, the at least one switching unit provided in the first pipe and the second pipe is different from the at least one switching unit provided in the third pipe.

According to the sample purification apparatus described in Clause 3, since the switching unit through which a solution passes can be different between the pipe through which the solution (the oxidizing agent or the heavy solution) is introduced into the container and the pipe through which the waste solution is discharged from the container to the outside, the mixed sample can more accurately be purified.

(Clause 4) The sample purification apparatus described in Clause 2 or 3 includes a fourth pipe for introduction into the container, of a rinse solution for cleaning of the inside of the container and at least one switching unit provided in the fourth pipe, the at least one switching unit switching between entry and exit of a solution. The control unit controls the at least one switching unit provided in the fourth pipe to introduce the rinse solution through the fourth pipe into the container from which the waste solution has been discharged.

According to the sample purification apparatus described in Clause 4, the container from which the waste solution has been discharged can be cleaned by introduction of the rinse solution into that container.

(Clause 5) In the sample purification apparatus described in Clause 4, the at least one switching unit provided in the second pipe is identical to the at least one switching unit provided in the fourth pipe.

According to the sample purification apparatus described in Clause 5, the number of parts of the sample purification apparatus can be reduced and cost can be suppressed.

(Clause 6) In the sample purification apparatus described in Clause 4 or 5, the control unit controls the at least one switching unit after the supernatant produced by introduction of the heavy solution flows out to the outside of the container, to discharge through the third pipe, the waste solution in the container into which the heavy solution has been introduced, to introduce the rinse solution through the fourth pipe into the container from which the waste solution has been discharged, and to discharge through the third pipe, the waste solution in the container into which the rinse solution has been introduced.

According to the sample purification apparatus described in Clause 6, since the used container is automatically cleaned after collection of a component to be collected, the user himself/herself does not have to clean the container so that time and efforts are minimized.

(Clause 7) The sample purification apparatus described in any one of Clauses 1 to 6 includes a stirring unit that stirs the mixed sample in the container and the control unit controls the stirring unit to stir the mixed sample in the container into which the oxidizing agent has been introduced.

According to the sample purification apparatus described in Clause 7, since the mixed sample and the oxidizing agent introduced into the container can uniformly be mixed with each other, the mixed sample can more accurately be purified.

(Clause 8) The sample purification apparatus described in Clause 7 includes a heating unit that heats the mixed sample in the container. The control unit controls the heating unit to heat the mixed sample in the container into which the oxidizing agent has been introduced.

According to the sample purification apparatus described in Clause 8, since the mixed sample and the oxidizing agent introduced into the container can uniformly be mixed with each other while they are heated, the mixed sample can more accurately be purified.

(Clause 9) The sample purification apparatus described in any one of Clauses 1 to 8 includes at least one port provided in the container. The solution comes in and goes out between the at least one port and the at least one switching unit. The at least one port includes a filter.

According to the sample purification apparatus described in Clause 9, discharge to the outside, of a component to be collected that is contained in the mixed sample can be prevented as much as possible.

(Clause 10) The sample purification apparatus described in Clause 8 includes a temperature sensor that measures a temperature of the mixed sample in the container. The control unit controls the heating unit based on a measurement value from the temperature sensor.

According to the sample purification apparatus described in Clause 10, since the sample can appropriately be heated based on the temperature of the sample, for example, excessive heating and resultant boiling of the sample can be prevented as much as possible. Furthermore, since the worker does not have to always observe a condition of progress of oxidation reaction of the sample, the mixed sample can accurately be purified with time and efforts of the user such as the worker being minimized.

(Clause 11) The sample purification apparatus described in Clause 8 or 10 includes a cooling unit that cools the mixed sample in the container and a temperature sensor that measures a temperature of the mixed sample in the container. The control unit controls the cooling unit based on a measurement value from the temperature sensor.

According to the sample purification apparatus described in Clause 11, since the temperature of the sample can be adjusted to an appropriate temperature based on the temperature of the sample, for example, excessive heating and resultant boiling of the sample can be prevented as much as possible. Furthermore, since the worker does not have to always observe a condition of progress of the oxidation reaction of the sample, the mixed sample can accurately be purified with time and efforts of the user such as the worker being minimized.

(Clause 12) The sample purification apparatus described in Clause 8 includes a camera that shoots the mixed sample in the container. The control unit controls the heating unit based on a shot image of the mixed sample obtained by the camera.

According to the sample purification apparatus described in Clause 12, since the sample can appropriately be heated based on a state of the sample specified from the shot image of the sample, for example, excessive heating and resultant boiling of the sample can be prevented as much as possible. Furthermore, since the worker does not have to always observe a condition of progress of the oxidation reaction of the sample, the mixed sample can accurately be purified with time and efforts of the user such as the worker being minimized.

(Clause 13) The sample purification apparatus described in Clause 8 or 12 includes a cooling unit that cools the mixed sample in the container and a camera that shoots the mixed sample in the container. The control unit controls the cooling unit based on a shot image of the mixed sample obtained by the camera.

According to the sample purification apparatus described in Clause 13, since the temperature of the sample can be adjusted to an appropriate temperature based on the state of the sample specified from the shot image of the sample, for example, excessive heating and resultant boiling of the sample can be prevented as much as possible. Furthermore, since the worker does not have to always observe a condition of progress of the oxidation reaction of the sample, the mixed sample can accurately be purified with time and efforts of the user such as the worker being minimized.

(Clause 14) The sample purification apparatus described in Clause 2 includes a fourth pipe for introduction of water into the container and at least one switching unit provided in the fourth pipe, the at least one switching unit switching between entry and exit of a solution. The control unit controls the at least one switching unit provided in the fourth pipe before introduction of the oxidizing agent through the first pipe, to introduce the water through the fourth pipe into the container.

According to the sample purification apparatus described in Clause 14, owing to mixing of the oxidizing agent introduced into the container with water in the container, abrupt reaction of the sample accommodated in the container with the oxidizing agent can be avoided as much as possible.

(Clause 15) In the sample purification apparatus described in Clause 2, the control unit controls the at least one switching unit provided in the first pipe to introduce the oxidizing agent by a prescribed amount in constant cycles through the first pipe into the container where the mixed sample is accommodated.

According to the sample purification apparatus described in Clause 15, as the oxidizing agent is introduced by a prescribed amount to the sample accommodated in the container, abrupt reaction of the sample accommodated in the container with the oxidizing agent can be avoided as much as possible.

(Clause 16) An analysis system according to one aspect includes the sample purification apparatus described in any one of Clauses 1 to 15 and an analysis apparatus that analyzes the component collected by the collector of the sample purification apparatus.

According to the analysis system described in Clause 16, since a series of works from introduction of the mixed sample into the sample purification apparatus until analysis of the component to be collected by the analysis apparatus is automated by control by the control unit, convenience of the user is improved.

(Clause 17) A sample purification method of purifying a mixed sample according to one aspect includes introducing an oxidizing agent for treatment of a contaminant into a container where the mixed sample is accommodated, discharging a waste solution in the container resulting from treatment of the contaminant with the oxidizing agent, introducing a rinse solution for cleaning of the inside of the container into the container from which the waste solution has been discharged, and flowing out, by introducing into the container a heavy solution for separating the mixed sample based on a specific gravity difference, a supernatant produced by introduction of the heavy solution to the outside of the container.

According to the sample purification method described in Clause 17, since the mixed sample can be purified through successive works with the use of a single container, the mixed sample can accurately be purified with time and efforts of a user such as a worker being minimized.

(Clause 18) A control program for purifying a mixed sample according to one aspect causes a computer to perform introducing an oxidizing agent for treatment of a contaminant into a container where the mixed sample is accommodated, discharging a waste solution in the container resulting from treatment of the contaminant with the oxidizing agent, introducing a rinse solution for cleaning of the inside of the container into the container from which the waste solution has been discharged, and flowing out, by introducing into the container a heavy solution for separating the mixed sample based on a specific gravity difference, a supernatant produced by introduction of the heavy solution to the outside of the container.

According to the control program described in Clause 18, since the mixed sample can be purified through successive works with the use of a single container, the mixed sample can accurately be purified with time and efforts of a user such as a worker being minimized.

REFERENCE SIGNS LIST

1, 1A, 1B sample purification apparatus; 11, 12, 13, 14, 15 pipe; 20 flow-out port; 21 detection filter; 25, 25A flow-out pipe; 25B introduction pipe; 31, 32, 33, 34, 232 pump; 31*a*, 32*a*, 33*a*, 34*a*, 64*a*, 232*a* valve; 41, 45, 242 electromagnetic valve; 50, 110, 120, 130, 140, 150, 210 container; 51, 52, 53, 54 main body portion; 61, 62, 63, 64 port; 71 constant-temperature stirrer; 72 stirring bar; 75 Peltier element; 80 temperature sensor; 90 camera; 100, 100A, 100B sample purification instrument; 151, 152, 153, 154 side surface; 155 bottom surface; 156, 157 hole; 160 central axis; 163, 164 filter; 500, 500A, 500B computer; 501 computing device; 502 memory; 503 network controller; 504 display device; 505 input device; 506 data reading device; 507 storage medium; 510 storage; 511 control program; 512 control data; 521 upper portion; 522 lower portion; 600 classification apparatus; 700 analysis apparatus; 1000 analysis system

The invention claimed is:

1. A sample purification apparatus that purifies a mixed sample, the sample purification apparatus comprising:

a container configured to separate, with a heavy solution, the mixed sample based on a specific gravity difference;

a heavy solution introduction portion configured to introduce the heavy solution into the container;

a flow-out portion provided at a top of the container and positioned vertically above the heavy solution introduction portion in the container, the flow-out portion being arranged so that a supernatant of a solution in the container is flowed out to the outside of the container by the introduction of the heavy solution into the container;

a flow-out path configured to guide the supernatant flowed out through the flow-out portion;

a collector provided vertically below the flow-out portion in the container, the collector being configured to collect a component in the mixed sample, the component being lighter in specific gravity than the heavy solution from the supernatant flowed out from the flow-out portion and guided by the flow-out path;

a decomposition agent introduction portion for introduction into the container, of a decomposition agent for treatment of a contaminant contained in the mixed sample;

a waste solution discharge portion for discharge of a waste solution in the container;

at least one switching unit respectively provided in each of the decomposition agent introduction portion, the heavy solution introduction portion, and the waste solution discharge portion, each switching unit being configured to switch between entry and exit of a solution;

a control unit that controls the switching units;

a water introduction portion for introduction of water into the container; and at least one switching unit provided in the water introduction portion and configured to switch between entry and exit of a solution, wherein the container has a horizontal cross-sectional area which decreases upward starting from a prescribed height of the container to a height where the flow-out portion is located, wherein the control unit controls the switching units to introduce the decomposition agent through the decomposition agent introduction portion into the container where the mixed sample is accommodated, to discharge through the waste solution discharge portion, the waste solution in the container resulting from treatment of the contaminant with the decomposition agent, and to introduce the heavy solution through the heavy solution introduction portion into the container, and the control unit controls the at least one switching unit provided in the water introduction portion before introduction of the decomposition agent through the decomposition agent introduction portion, to introduce the water through the water introduction portion into the container.

2. The sample purification apparatus according to claim 1, wherein the at least one switching unit provided in the decomposition agent introduction portion and the at least one switching unit provided in the heavy solution introduction portion are different from the at least one switching unit provided in the waste solution discharge portion.

3. The sample purification apparatus according to claim 1, further comprising:

a rinse solution introduction portion for introduction into the container, of a rinse solution for cleaning of an inside of the container; and at least one switching unit provided in the rinse solution introduction portion and configured to switch between entry and exit of a solution, wherein the control unit controls the at least one switching unit provided in the rinse solution introduction portion to introduce the rinse solution through the rinse solution introduction portion into the container from which the waste solution has been discharged.

4. The sample purification apparatus according to claim 3, wherein the at least one switching unit provided in the heavy solution introduction portion is identical to the at least one switching unit provided in the rinse solution introduction portion.

5. The sample purification apparatus according to claim 3, wherein the control unit controls the switching units after the supernatant produced by introduction of the heavy solution flows out to the outside of the container, to discharge through the waste solution discharge portion, the waste solution in the container into which the heavy solution has been introduced, to introduce the rinse solution through the rinse solution introduction portion into the container from which the waste solution has been discharged, and to discharge through the waste solution discharge portion, the waste solution in the container into which the rinse solution has been introduced.

6. The sample purification apparatus according to claim 1, further comprising a stirring unit that stirs the mixed sample in the container, wherein the control unit controls the stirring unit to stir the mixed sample in the container into which the decomposition agent has been introduced.

7. The sample purification apparatus according to claim 6, further comprising a heating unit that heats the mixed sample in the container, wherein the control unit controls the heating unit to heat the mixed sample in the container into which the decomposition agent has been introduced.

8. The sample purification apparatus according to claim 1, further comprising at least one port provided in the container, wherein a solution comes in and goes out between the at least one port and at least one of the switching units, and the at least one port includes a filter.

9. The sample purification apparatus according to claim 7, further comprising a temperature sensor that measures a temperature of the mixed sample in the container, wherein the control unit controls the heating unit based on a measurement value from the temperature sensor.

10. The sample purification apparatus according to claim 7, further comprising:

a cooling unit that cools the mixed sample in the container; and a temperature sensor that measures a temperature of the mixed sample in the container, wherein the control unit controls the cooling unit based on a measurement value from the temperature sensor.

11. The sample purification apparatus according to claim 7, further comprising a camera that obtains an image of the mixed sample in the container, wherein the control unit controls the heating unit based on the image of the mixed sample obtained by the camera.

12. The sample purification apparatus according to claim 7, further comprising:

a cooling unit that cools the mixed sample in the container; and a camera that obtains an image of the mixed sample in the container, wherein the control unit controls the cooling unit based on the image of the mixed sample obtained by the camera.

13. The sample purification apparatus according to claim 1, wherein the control unit controls the at least one switching unit provided in the decomposition agent introduction portion to introduce the decomposition agent by a prescribed amount in constant cycles through the decomposition agent introduction portion into the container where the mixed sample is accommodated.

14. An analysis system comprising:

the sample purification apparatus according to claim 1; and an analysis apparatus that analyzes the component collected by the collector of the sample purification apparatus.

* * * * *